(12) United States Patent
Dowlatkhah et al.

(10) Patent No.: US 10,205,825 B2
(45) Date of Patent: Feb. 12, 2019

(54) SYSTEM AND METHOD FOR PROCESSING AN AUTOMATED CALL BASED ON PREFERENCES AND CONDITIONS

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/445,881

(22) Filed: Feb. 28, 2017

(65) Prior Publication Data

US 2018/0249006 A1   Aug. 30, 2018

(51) Int. Cl.
*H04M 3/436* (2006.01)
*H04W 64/00* (2009.01)
*H04W 8/18* (2009.01)

(52) U.S. Cl.
CPC ............ *H04M 3/436* (2013.01); *H04W 8/18* (2013.01); *H04W 64/00* (2013.01); *H04M 2203/2072* (2013.01); *H04M 2250/12* (2013.01)

(58) Field of Classification Search
CPC .... H04M 3/523; H04M 3/493; H04M 3/5166; H04M 3/5191; H04M 3/5183; H04M 3/5232; H04M 3/533; H04M 11/00; H04M 15/06; H04M 1/274575; H04M 3/4211; H04W 4/14; H04W 48/02; H04W 48/18; H04W 4/22

USPC ......... 455/414.1, 445, 417, 418; 379/265.02, 379/265.01, 88.18, 265.06, 309, 32.01
See application file for complete search history.

(56) References Cited

U.S. PATENT DOCUMENTS

| | | | |
|---|---|---|---|
| 8,942,357 B2 | 1/2015 | Goulet | |
| 9,014,359 B1 | 4/2015 | Pfeffer et al. | |
| 9,112,731 B2 | 8/2015 | Cohen | |
| 9,125,057 B2 | 9/2015 | Neal et al. | |
| 9,160,846 B2 | 10/2015 | Daniel et al. | |
| 9,386,149 B2 | 7/2016 | Korn | |
| 9,407,767 B2 | 8/2016 | Jain et al. | |
| 9,491,286 B2 | 11/2016 | Sharpe | |
| 2011/0040629 A1 | 2/2011 | Chiu et al. | |
| 2014/0185786 A1* | 7/2014 | Korn ................ | H04M 3/4365 379/210.02 |
| 2014/0192965 A1* | 7/2014 | Almeida ............ | H04M 3/436 379/210.02 |
| 2015/0182843 A1 | 7/2015 | Esposito et al. | |
| 2016/0050316 A1 | 2/2016 | Jain et al. | |
| 2016/0088453 A1* | 3/2016 | Joo .................. | H04W 4/16 455/414.1 |
| 2016/0335410 A1 | 11/2016 | Swank | |

\* cited by examiner

*Primary Examiner* — Fred Casca
(74) *Attorney, Agent, or Firm* — Amin, Turocy & Watson, LLP

(57) ABSTRACT

A system can be operable to receive an automated call from a communications device, determine whether preferences associated with a called party identity), is applicable to the automated call, and determine whether a condition that precludes acceptance of the automated call is present. The determination of whether the condition is present can be based on information received from a sensory device coupled to the user device. In response to the condition being determined to be present, the automated call can be denied.

20 Claims, 21 Drawing Sheets

SYSTEM AND METHOD FOR PROCESSING AN AUTOMATED CALL BASED ON PREFERENCES AND CONDITIONS

TECHNICAL FIELD

The present application relates generally to the field of privacy, and, for example, determining whether a condition precludes acceptance of an automated call.

BACKGROUND in today's busy world, receiving calls at inconvenient times can be very annoying, especially if a called party is not interested in the subject matter to which the calls relate, or if the called party receives repeated calls at inopportune times. There has been an increase in the number of automated calls (e.g., robocalls) in which a large number of calls are automatically directed to called parties by automated callers, which typically play a pre-recorded message for the called parties. There has been some effort to reduce and even limit such calls by enforcing the laws in which called parties on a "do not call" list are not be called. However, the majority of these automated calls do not even originate from the United States. There are large call centers in remote corners of the world where U.S. laws are inapplicable, or the calling parties simply ignore the applicable laws. Additionally, there have been incidences in which robocall systems have been used maliciously to perpetrate fraudulent transactions. According to the federal communications commission (FCC), it received more than 214,000 complaints about unwanted calls in 2014.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
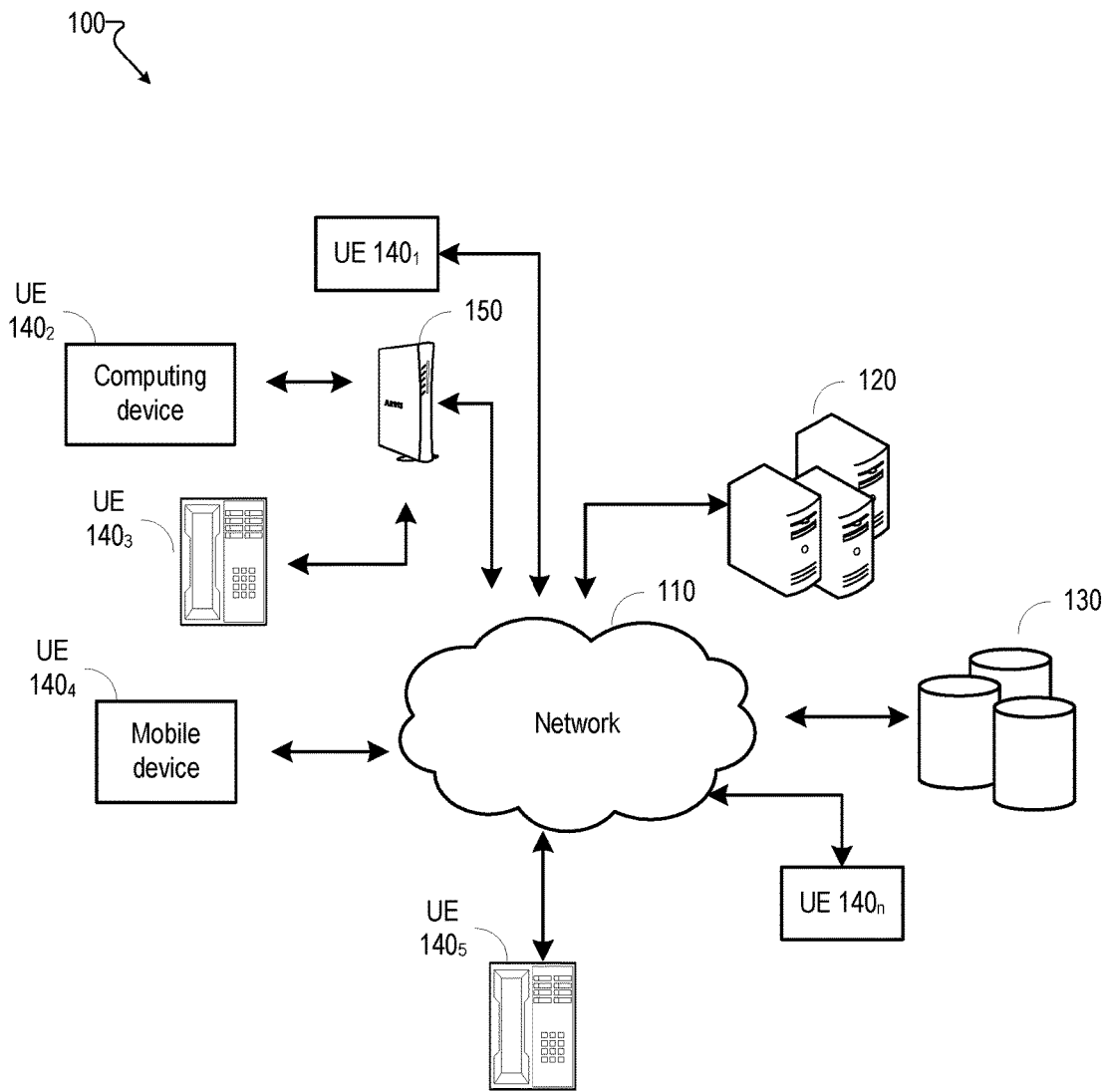
FIG. 1 illustrates an example system and networking environment for accessing on-line services and products.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth to provide a more thorough understanding of the subject disclosure. It might be evident, however, that the subject disclosure can be practiced without these specific details. In other instances, well-known structures and devices are shown in block diagram form to facilitate describing the subject disclosure.

The subject disclosure of the present application describes systems and methods (comprising example computer processing systems, computer-implemented methods, apparatus, computer program products, etc.) for processing a call. The methods (e.g., processes and logic flows) described in this specification can be performed by devices comprising programmable processors that execute machine-executable instructions to facilitate performance of the operations described herein. Examples of such devices are described in the figures herein (for example, FIG. 1, FIG. 2, FIG. 6, FIG. 7, FIG. 9, and FIG. 10), and can comprise circuitry and components as described in FIG. 20 and FIG. 21. Example embodiments and components can take the form of an entirely hardware embodiment, an entirely software embodiment, or an embodiment combining software and hardware aspects.

Example embodiments are described below with reference to block diagrams and flowchart illustrations of methods, apparatuses, and computer program products. Steps of the block diagrams and flowchart illustrations support combinations of mechanisms for performing the specified functions, combinations of steps for performing the specified functions, and program instructions for performing the specified functions. Example embodiments may take the form of web, mobile, wearable computer-implemented, computer software. It should be understood that each step of the block diagrams and flowchart illustrations, combinations of steps in the block diagrams and flowchart illustrations, or any functions, methods, and processes described herein, can be implemented by a computer executing computer program instructions. These computer program instructions may be loaded onto a general-purpose computer, special purpose computer, combinations of special purpose hardware and other hardware, or other programmable data processing apparatus. Example embodiments may take the form of a computer program product stored on a machine-readable storage medium comprising executable instructions (e.g., software) that, when executed by a processor, facilitate performance of operations described herein. Any suitable machine-readable storage medium may be utilized including, for example, hard disks, compact disks, DVDs, optical data stores, and/or magnetic data stores.

The present application describes systems that can be operable to receive an automated call from a communications device, determine whether preferences associated with a called party identity), is applicable to the automated call, and determine whether a condition that precludes acceptance of the automated call is present. The determination of whether the condition is present can be based on information received from a sensory device coupled to the user device. In response to the condition being determined to be present, the automated call can be denied.

FIG. 1 is a diagram illustrating an example of system 100 in which a user equipment can access on-line services provided through one or more server devices having access to one or more data stores, or can make phone calls from a device owned by a calling party identity to a device owned by a called party identity. The system 100 can comprise one or more computer networks 110, one or more servers 120, one or more data stores 130 (each of which can contain one or more databases of information), and one or more user equipment ("UE") $140_{1-N}$. The servers 120 and user equipment 140, which can be computing devices as described in FIG. 20 and FIG. 21, can execute software modules that can facilitate various functions, methods, and processes described herein.

In example embodiments, the one or more computer networks 110 (network 110) can be operable to facilitate communication between the server(s) 120, data store(s) 130, and UEs 140. The one or more networks 110 may include any of a variety of types of wired or wireless computer networks such as a cellular network, private branch exchange (PBX), private intranet, public switched telephone network (PSTN), plain old telephone service (POTS), satellite network, WiMax, data over cable network (e.g., operating under one or more data over cable service interface specification (DOCSIS)), or any other type of computer or communications network. The communications networks can also comprise, for example, a local area network (LAN), such as an office or Wi-Fi network.

Referring to FIG. 1, the network 110 can be a cellular network employing various cellular technologies and modulation schemes to facilitate wireless radio communications between devices. For example, network 110 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, and resource-block-filtered OFDM. However, various features and functionalities of system 100 are particularly described wherein the devices (e.g., the UEs 102 and the network device 104) of system 100 are configured to communicate through wireless signals using one or more multi-carrier modulation schemes, wherein data symbols can be transmitted simultaneously over multiple frequency subcarriers.

In example embodiments, network 110 can be configured to provide and employ 5G wireless networking features and functionalities. 5G wireless communication networks are expected to fulfill the demand of exponentially increasing data traffic and to allow people and machines to enjoy gigabit data rates with significantly reduced latency. Compared to 4G, 5G can support more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, "internet of things" (IoT) devices, as well as machine type communications (MTCs). Considering the drastically different communication resources of these different traffic scenarios, the ability to dynamically configure waveform parameters based on traffic scenarios while retaining the benefits of multi-carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. The upcoming 5G access network can also employ an architecture in which a user plane and control plane are separate, wherein complex control plane functions are abstracted from forwarding elements, simplifying user plane operations by relocating control logic to physical or virtual servers.

Still referring to FIG. 1, the communications network 110 can comprise a fixed-packet network. The fixed packet network can be a broadband network using internet protocol (IP) to deliver video, voice, and data. An example of such a network is a cable television (CATV) infrastructure implementing the data over cable service interface specification (DOCSIS) and PacketCable standards, which allow a multiple service operator (MSO) to offer both high-speed internet and voice over internet protocol (VoIP) through an MSO's cable infrastructure. In some implementations, the fixed packet network can have headend equipment such as a cable modem termination system (CMTS) that communicates through one or more hybrid fiber coax (HFC) networks with user premises equipment such as a cable modem or embedded multimedia terminal adapter (EMTA) (see below). The fixed packet network can also comprise networks using asynchronous transfer mode (ATM), digital subscriber line (DSL), or asymmetric digital subscriber line (ADSL) technology. These networks have typically been provided by telephone companies. ATM and DSL/ADSL equipment can be located at an exchange or central office, and can include integrated DSL/ATM switches, multiplexers such as digital subscriber line access multiplexers (DSLAMS), and broadband remote access servers (B-RAS), all of which can contribute to the aggregation of communications from user equipment onto a high-capacity uplink (ATM or Gigabit Ethernet backhaul) to internet service providers (ISPs). Transmission media connecting the central office and user equipment can include both twisted pair and fiber.

The network 110 can also comprise a one or more satellite networks, which can enable the exchange of voice, data, and video. In addition to television programming services, satellite networks, such as a DBS (Direct Broadcast Satellite) system, operated by DBS broadcast satellite providers (e.g., Dish Networks, DIRECTV, HughesNet), can be operable to enable high speed internet and voice services.

The network 110 can also comprise a POTS network that supports the delivery of voice services employing analog signal transmission over copper loops.

Referring to FIG. 1, servers 120 can be operable to send via network 110 executable code capable of generating graphical user interfaces (GUIs) that a user identity can interact with to facilitate the provision of such on-line data, or voice services. The GUIs can be, for example, a webpage that can be displayed (and interacted with) on a user equipment 140. Modules comprising executable instructions that, when executed by a processor of the server 120, facilitate performance of operations, such as the exchange of data or the exchange of voice (e.g., a soft phone), can be stored on a memory device of the server 120 (or a memory device connected to the server 120).

The data stores 130 can comprise physical media for storing information, housed within the one or more servers 120, peripherally connected to the one or more servers, or connected to the servers 120 through one or more networks. For example, the storage device can be connected to the processor of a server, via, for example, a communications medium such as a bus (e.g., SATA, eSATA, SCSI, flash, or the like). As another example, data stores 130 can be peripheral devices, set up as a redundant array of independent disks (RAID) array, a storage area network (SAN), or network attached storage (NAS). The data stores can comprise magnetic memory, such as a hard drive or a semiconductor memory, such as Random Access Memory (RAM), Dynamic RAM (DRAM), non-volatile computer memory, flash memory, or the like. The memory can include operating system, administrative, and database program modules that support the methods and programs disclosed in this application.

Referring to FIG. 1, user equipment 140 can be, for example, a tablet computer, a desktop computer, or laptop computer, a cellular enabled laptop (e.g., comprising a broadband adapter), a handheld computing device, a mobile phone, a telephone, a smartphone, a tablet computer, a wearable device, a virtual reality (VR) device, a heads-up display (HUD) device, an IoT device, and the like.

In example embodiments, a customer premises equipment (CPE) 150 can provide access for the UE (e.g., UE $140_2$) to the one or more networks 110. The CPE 150 can comprise a broadband access modem (e.g., cable modem, DSL modem, Wi-MAX modem, satellite modem). The CPE 150 can also comprise a gateway device (also referred to as a residential gateway, home gateway, set top gateway) that processes video, voice packets, and data packets and serves as a broadband connectivity point for various devices (e.g., video set-top boxes, computers, mobile devices, telephones). The UE (e.g., UE $140_2$) can be connected to the CPE device via, for example, an Ethernet interface, or a wireless access point device (which can be embedded within the CPE device, or connected to the CPE device as a peripheral device), which can operate in accordance with the IEEE 802.11 family of standards.

For voice services, a computer (or computing device) connected to a network 110 that executes VoIP software can allow for voice calls to be made via a computer application (i.e., a "softphone" such as that offered by Skype). The VoIP software can be provided by one or more servers 120. Additionally, the CPE 150 can be embedded with a VoIP adapter, through which a telephone $140_3$ can connect (e.g., via an RJ-11 phone jack) and make voice calls. Examples of such devices that support voice and data communications are referred to as a telephony modems, embedded multimedia terminal adapters (EMTAs), digital voice modems, voice data modems, voice and internet modems, and the like. In other embodiments, a VoIP adapter can be peripheral to the broadband modem, and the telephone can connect to that VoIP adapter (e.g., an adapter provided by Vonage, Ooma, etc.). In other embodiments, a VoIP adapter can be connected to a computer, for example, via its universal serial bus (USB) port (e.g. an adapter provided by magicJack).

Referring to FIG. 1, a UE $140_4$ can be a mobile device used to make and accept voice calls, including a cellular phone, as well as a tablet with a cellular adapter. The mobile device can be operative to make voice calls through the network 110 to other communications devices. Further details describing a mobile device are described below in FIG. 21 below.

The UE 140 can also be a POTS telephone 140$_5$ connected to the network 110.

Figure 2:
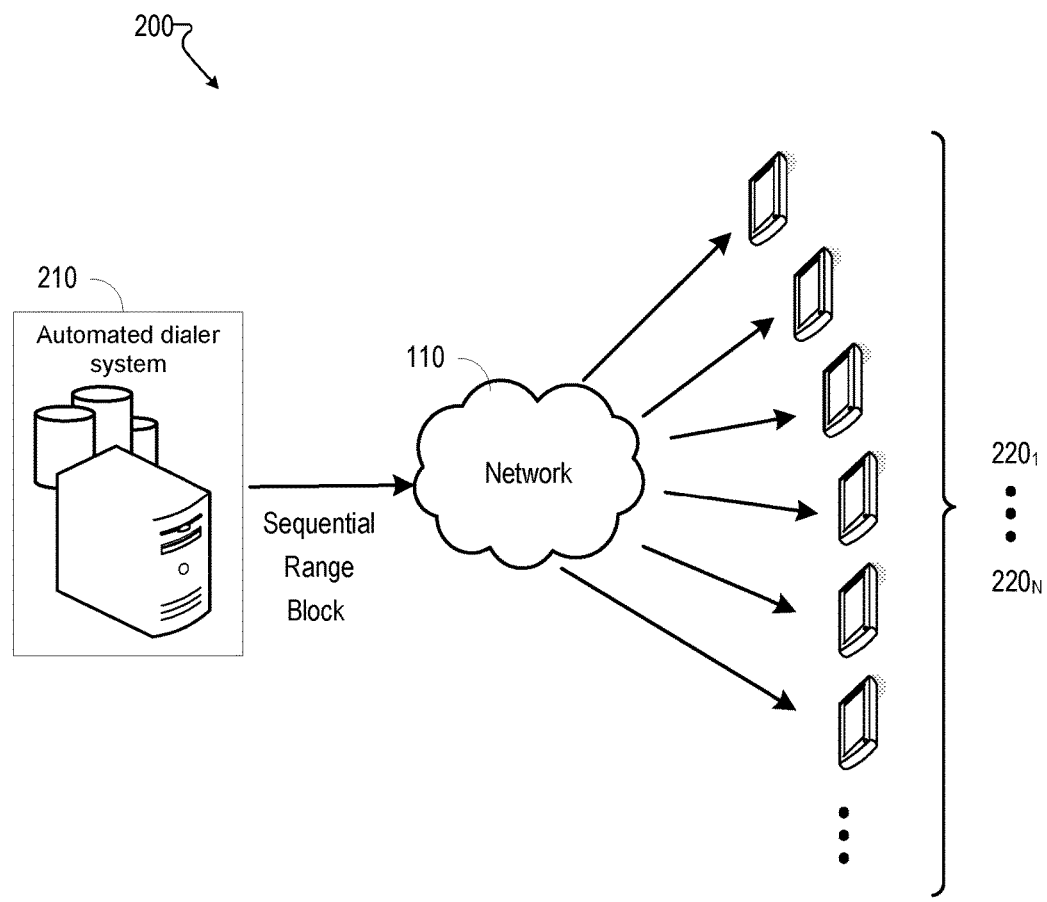
FIG. 2 illustrates an example system and networking environment in which an automated dialer calls multiple user equipment.

FIG. 2 is a diagram that illustrates an example networking environment in which a typical automated dialer 210 can be operable to initiate automated calls (e.g., robocalls). Typically, an automated dialer 210 (also referred to as an automated dialer system, automated calling system, robo-caller, or predictive dialer) is used in business to consumer (B2C) applications, and can be one or more computers operable to run modules that, when executed, automatically makes voice calls, which can be made simultaneously or in rapid succession, to a plurality of call destinations. The automated dialer 210 can be for example, a UE having a broadband connection and operable to make VoIP calls (e.g., UE 140$_2$), and the modules can be locally stored or provided by one or more servers (e.g., servers 120). The automated dialer 210 can make voice calls to called party UEs 220$_{1-N}$, which can be one or more UEs 140 (e.g., a cellular phone, a VoIP phone, a POTS phone, etc.) that are operable to answer voice calls. After connection with a called party UE 220 (one of the plurality of called party UEs 220$_{1-N}$) the automated dialer 210 plays a pre-recorded message to either the called party identity, or a voicemail system if the called party identity does not answer. Almost all robocalls originate through a VoIP network. Example vendors of automated dialers and predictive dialers can include Voice2Phone, VoiceShot, Voicent, CallFire and Five9.

Intercepting and blocking unwanted automated calls can be a challenge, in large part because some of these calls are actual public service announcements, such as from the weather service, school system, public safety departments, etc. In other example use cases, companies and organizations can use automated calls as an effective way to distribute information. For example, a large religious congregation might use robocalls as an effective way to distribute pre-recorded messages. A sports league might use robocalls to distribute a message that playing fields are close due to inclement weather. A pharmacy might use an automated call to inform patients that their prescription is ready. There are many ways to mask a call as a legitimate call by "spoofing" the originating number, such that the automated call appears to a blocking system, as well as called party identities, as coming from a legitimate source. Additionally, some called party identities might desire to continue to receive robocalls for which they have an interest, or for calls that they signed up for.

Figure 3:
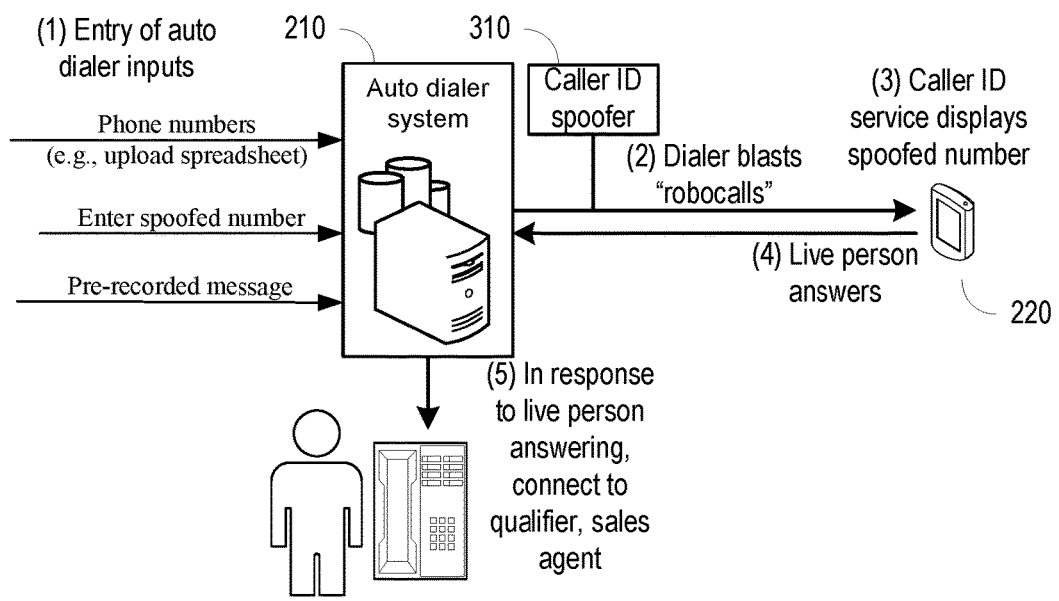
FIG. 3 is a diagram illustrating transactions between an example automated dialer and a called party user equipment.

In FIG. 3, a typical automated dialer 210 operated by marketing identities, can at transaction (1) receive automated dialer inputs. An automated dialer input can comprise a plurality of target phone numbers corresponding to called party UEs (e.g., UEs 220$_{1-N}$). The phone numbers might have been collected from called party identities, who might have provided their phone numbers in response to surveys, purchases, etc. A typical automated dialer 210 allows input of phone numbers manually, as well by uploading a spreadsheet, or some other type of file, having the phone numbers. An automated dialer input can also comprise a "spoofed" number. A marketing identity can enter a number that the marketing identity wants to appear on a called party UE 220's caller ID display, instead of the originating number of the automated call (e.g., number of the calling party, also known as an "A number"). An automated dialer input can also comprise a pre-recorded message (e.g., an audio file) which can be input by uploading or otherwise transferring the file to the automated dialer 210. The pre-recorded message is played by the automated dialer 210 when the automated call is answered by the called party UE 220 (or its answering service).

At transaction (2) of FIG. 3, the automated dialer 210 can make a multitude of voice calls directed at called party UEs 220$_{1-N}$. For illustrative purposes, only one called party UE 220 is shown. The automated dialer 210, with its own spoofing module, or through a caller ID spoofing system 310 provided by another server, can be operable to transmit the inputted spoofed number with the call in place of the originating number that would otherwise show up on a caller ID display. Thus, each call would have associated with it the spoofed caller ID number that was entered at transaction (1). The calls that are made by the auto-dialer can be directed to phone numbers input into the automated dialer 210 at transaction (1), as well as numbers selected by a predictive dialer, which can include numbers in a sequence (dialing numbers in sequential order), a block, or a range. Certain blocks of phone numbers are meant for certain businesses (for example, a block of numbers can be reserved for hospitals), and as such, numbers in particular blocks might be targeted by automated dialers. Numbers in a range are like numbers that are sequentially dialed, but are certain ranges of numbers within a sequence. Automated dialers can sometimes use ranges of numbers to avoid sequence dialing detecting algorithms that attempt to block automated calls (e.g., calling 0000 to 0500 might trigger an alert, but selecting a range of numbers within that sequence might avoid detection).

At transaction (3), when a called party UE 220 is dialed, a caller ID service might display the number to the called party identity via the called party UE 220's GUI. If an automated call contained a spoofed number, the spoofed number might appear.

A typical automated dialer 210 can be further operative to, in response to a called party identity answering an automated call, connect the called party UE 220 with a qualifier, wherein the qualifier might be an interactive voice response system (IVR) that prompts the called party identity to select or enter information. If certain information entered by the called party to the qualifier indicates that the called party identity's profile matches a profile of the marketing identity's target audience, the automated dialer 210 can be operative to connect the called party UE 220 with a sales agent.

Figure 4:
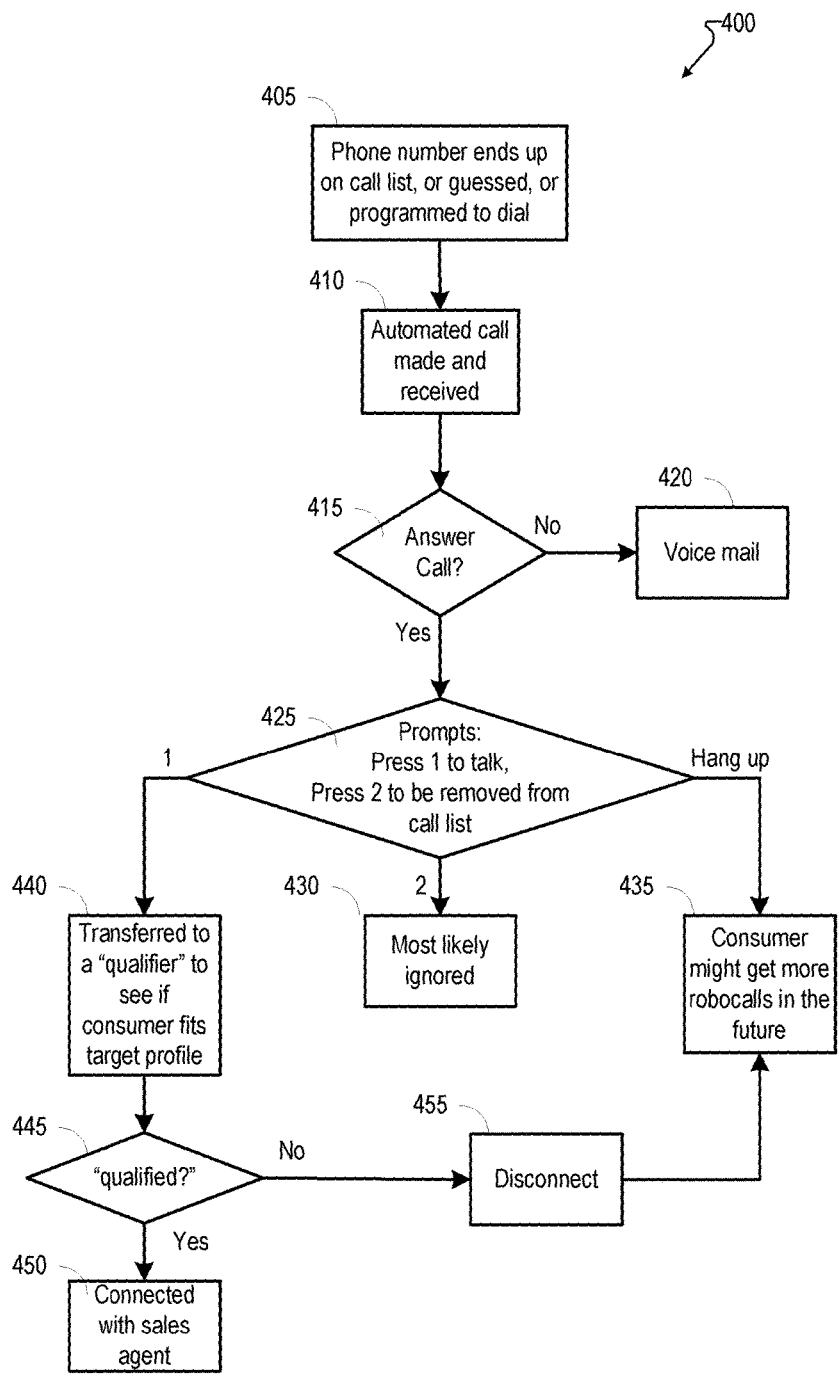
FIG. 4 is a flow chart illustrating an example of a called party's typical experience interacting with an automated dialer.

FIG. 4 illustrates a typical response and experience of a user identity to an automated call. At step 405, the called party identity might have responded to a survey, signed up for an event, filled out an on-line application, or gave approval for a particular service or application to access his or her contact information, wherein the contact information comprises the called party identity's phone number. The called party identity's phone number might eventually wind up on a marketing entity's phone list.

At step 410, the called party identity might receive a phone call (e.g., an incoming call) on his or her phone (e.g., called party UE 220). If the phone is operable to display caller ID information, the calling party's number and name might show up on the caller ID display. However, this number and information might be a spoofed number and spoofed name. The number might have, for example, an area code that is the same as the area code of the called party identity's phone number, such that the called party identity might believe that the calling party is a local identity, such as a nearby friend or neighbor, thereby increasing the probability that the called party identity will answer the automated call.

At step 415, the called party identity can decide whether to answer the call. In response to the user not taking the call, at step 420 the call might be directed to the called party identity's voice mail, in which case the automated dialer 210 plays the prerecorded message related to the subject matter of the sales call.

At step 425, if the called party identity answers the call, the automated dialer 210 plays a prerecorded message briefly describing the goods or services being sold, and then prompts the called party identity to either push a button to speak to a representative or push a button to be removed from the marketer's phone list.

At step 430, in response to a called party identity's selection to be removed from the marketer's phone list, the called party identity's selection will most likely be ignored. If the called party entity at step 435 decides to hang up (e.g., end the call), the called party might still get more automated calls in the future. If the called party identity responds by indicating a desire to speak with a representative, the automated dialer 210 might at step 440 connect the user with a qualifier, which can prompt the called party identity to select or enter information. If certain information entered indicates that the called party identity's profile matches a profile of the marketing identity's target audience, the called party identity at step 450 is transferred to a sales agent. If the called party identity's profile does not match, then at step 455 the automated dialer 210 can inform the called party identity that his or her profile does not qualify them for the offer, and then disconnect. After disconnection, as was the case at step 435, the called party identity might still get another automated call in the future. As such, with automated calls, the experience of a called party identity can range from being annoyed, to being angry and frustrated.

Figure 5:
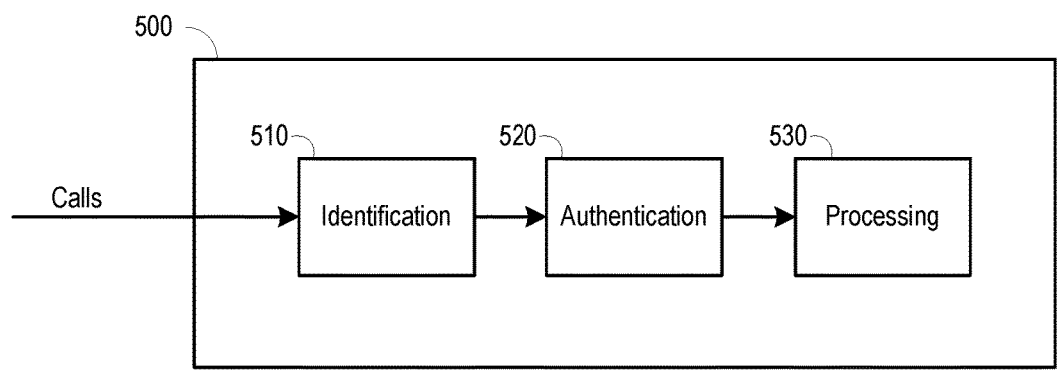
FIG. 5 is a block diagram providing an overview of an example process that can be performed by an automated call detection and processing system in accordance with various aspects and embodiments of the subject disclosure.

Referring to FIG. 5, in example embodiments of the present application described herein, an automated call detection and processing system 500 comprising one or more processors and one or more memories that can store executable instructions that, when executed by a processor, facilitate performance of identifying, authenticating, and blocking of automated calls, wherein the executable instructions can be comprised of one or more software modules. The system 500 can be implemented as a network device, which can comprise one or more servers, one or more data stores, or even within a communications switch. Regarding the operations, at the identification stage 510, the system can determine whether the originating number is a number that has been spoofed. While there might be legitimate reasons for a calling party's use of spoofed numbers (e.g., a police investigation in which an investigator uses a pretense), the likelihood that an automated call is vexatious, malicious, or fraudulent is higher when the calling party is spoofing its number. In response to a determination that the originating number has been spoofed, the system can determine whether the characteristics of the call are consistent with those of an automated call, for example exhibit certain patterns or behaviors (e.g., by determining whether the calls coming from the originating number are in a sequence, a range, or a block).

At the authentication stage 520, in response to a determination that the call is an automated call, the system 500 can be operative to determine whether the automated call originates from certain authorities approved for legitimate automated calls (e.g., emergency authorities, NSA, political fund raising, etc.). It can also be determined whether the originating number is in a database comprising crowd-sourced or investigated blacklisted numbers (e.g., known to be a source of malicious or vexatious automated calls), or whether the originating number is in a database comprising the called party's personalized black list.

At the blocking stage 530, in response to a determination during the authentication process that the automated call should be blocked, the system 500 can be operative to block the call (e.g., terminate the call), or alternatively, direct the call to a voice messaging system that answers with a "do not call."

In response to a determination during the authentication stage 520 that the automated call should not be blocked, the system 500 can be further operative to determine whether a condition that precludes connection of the automated call is present. The system can determine this based on, for example, whether the called party identity's preference data related to the originating number (e.g., stored in a data store in the network 110), is applicable to the automated call. The condition can relate to an event or activity in which the called party identity is engaged, or it can relate to a time or time frame. The condition can also relate to a place that the called party identity might be at (e.g., presence information), which might be derived from a global positioning system (GPS). A time, place, or activity can also be indicated by a calendar entry from the called party UE. A condition can also be whether a called party identity's UE is executing certain applications. If the condition is determined to be present, for example from a synthesis of some or all this information, the system 500 can be operable deny the call. Denying the call can comprise blocking the call, or directing the call to the called party identity's voice mail service, whereby the automated dialer, once connected, can leave a message for the called party identity.

Figure 6:
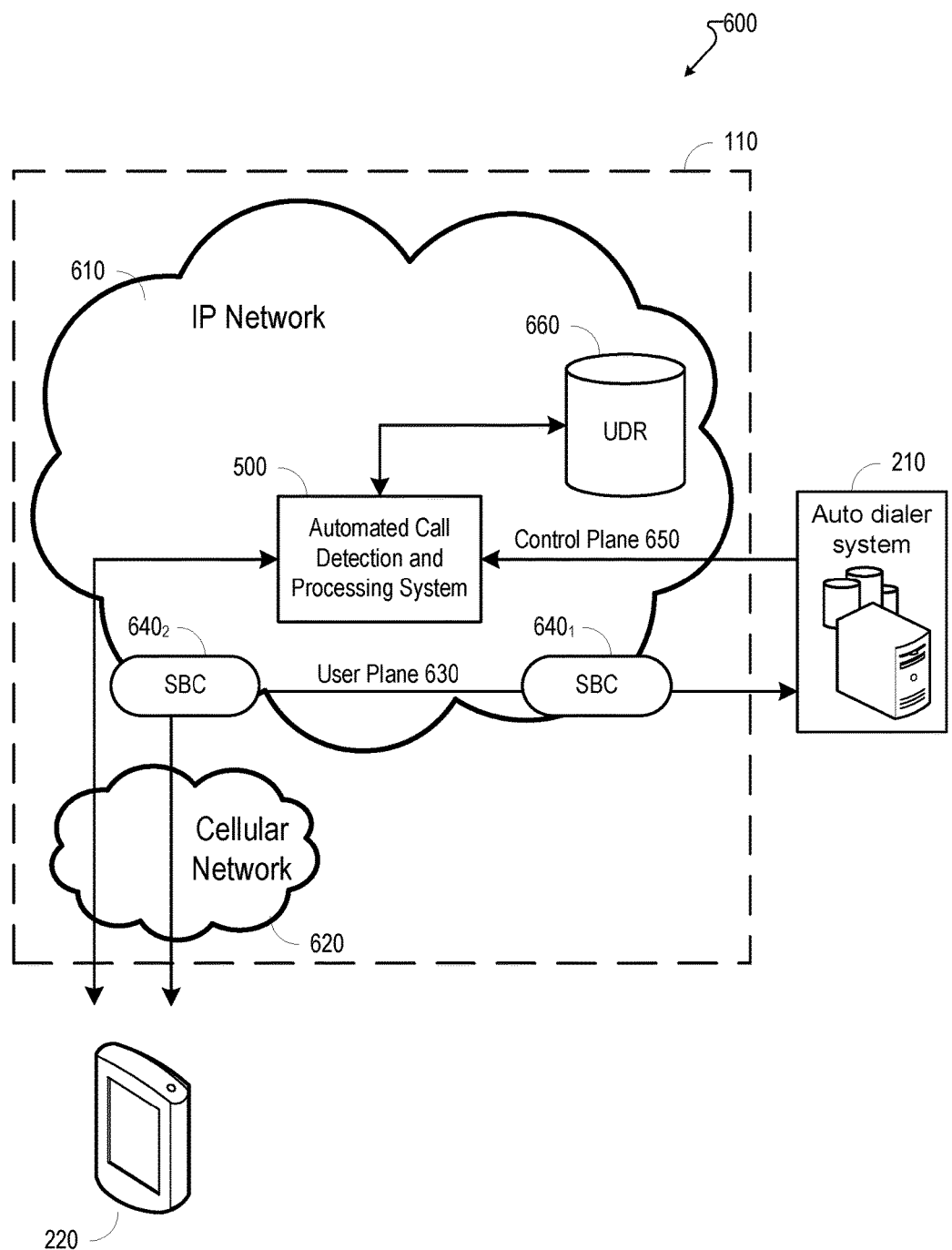
FIG. 6 is a block diagram illustrating an example communications network having an automated call detection and processing system in accordance with various aspects and embodiments of the subject disclosure.

FIG. 6 depicts an example environment 600 in which the automated call detection and processing system (e.g., call detection and processing system 500) can be implemented. The environment can comprise an automated dialer (e.g., automated dialer 210) that directs automated calls thought a communications network (e.g., network 110) to one or more called party UEs (e.g., UEs $220_{1-N}$). For illustrative purposes, only one called party UE 220 is shown.

In example embodiments, as shown in FIG. 6, the network can comprise an IP network 610, which can be a fixed packet network, and a cellular network 620. The call can be processed through a user plane and a control plane, wherein each plane can be conceptualized as different areas of communications operations. Each plane carries a different type of traffic and can be implemented as overlay networks that runs independently on top of another one, although supported by its infrastructure. The user plane (sometimes known as the data plane, forwarding plane, carrier plane, or bearer plane) carries the network user traffic, and the control plane carries signaling traffic. In example embodiments, the planes can be implemented in the firmware of routers and switches. Software-defined networking (SDN) decouples the data and control planes, removes the control plane from network hardware, and implements the control plane in software instead, which enables programmatic access and, as such, can make network administration much more flexible and dynamic A network administrator can shape traffic from a centralized control console without having to touch individual switches. The administrator can change any network switch's rules when necessary—prioritizing, de-prioritizing or even blocking specific types of packets.

With respect to FIG. 6, the user plane 630 can carry the network user traffic (e.g., voice traffic) between the automated dialer 210 and the called party UE 220. In the example embodiment shown, the communications through the user plane can comprise session border controllers (SBCs) 640₁ and 640₂ at the edge of the IP network 610, wherein an SBC can be hardware or software applications that oversees the manner in which calls (e.g., sessions) are initiated (set up), conducted, and terminated (or torn down) on a voice over internet protocol (VoIP) network, including for both telephone calls or other interactive media communications. An SBC can act as a router, allowing only authorized sessions to pass through the connection point (e.g., border). The SBC can also monitor the quality of service (QoS) status for calls, apply QoS rules, prioritized calls (e.g., emergency calls), and function as a firewall by identifying threats. Additionally, SBCs often provide measurement, access control, and data conversion for the calls they control. Typically, SBCs are deployed on both the carrier and enterprise sides of the connection.

In FIG. 6, the automated call detection and processing system 500 can operate at the control plane level, wherein the control plane 650 carries signaling traffic (e.g., control packets), including the control packets between automated dialer 210 and called party UE 220. The automated call detection and processing system 500, described in further detail below with respect to FIG. 7, can be operative to facilitate the identifying, authenticating, and blocking of automated calls. With respect to authentication, as mentioned above in FIG. 5 and its corresponding text, a called party identity, after being called by an automated dialer, can select for entry the originating number to a database comprising the called party's personalized black list. In example embodiments, the called party identity's entry can be stored with a called party identity's profile in a user data registry (UDR) 660, which can contain a multitude of profiles of different called party identities (e.g., crowdsourced from other parties who have been auto dialed). Other user data registries can comprise a home subscriber server (HS S) database, which contains subscription-related information (subscriber profiles), performs authentication and authorization of the callers, and provides information about a subscriber's location and IP information. Other user data registries can comprise a home location register (HLR), or an authentication centre (AuC).

Figure 7:
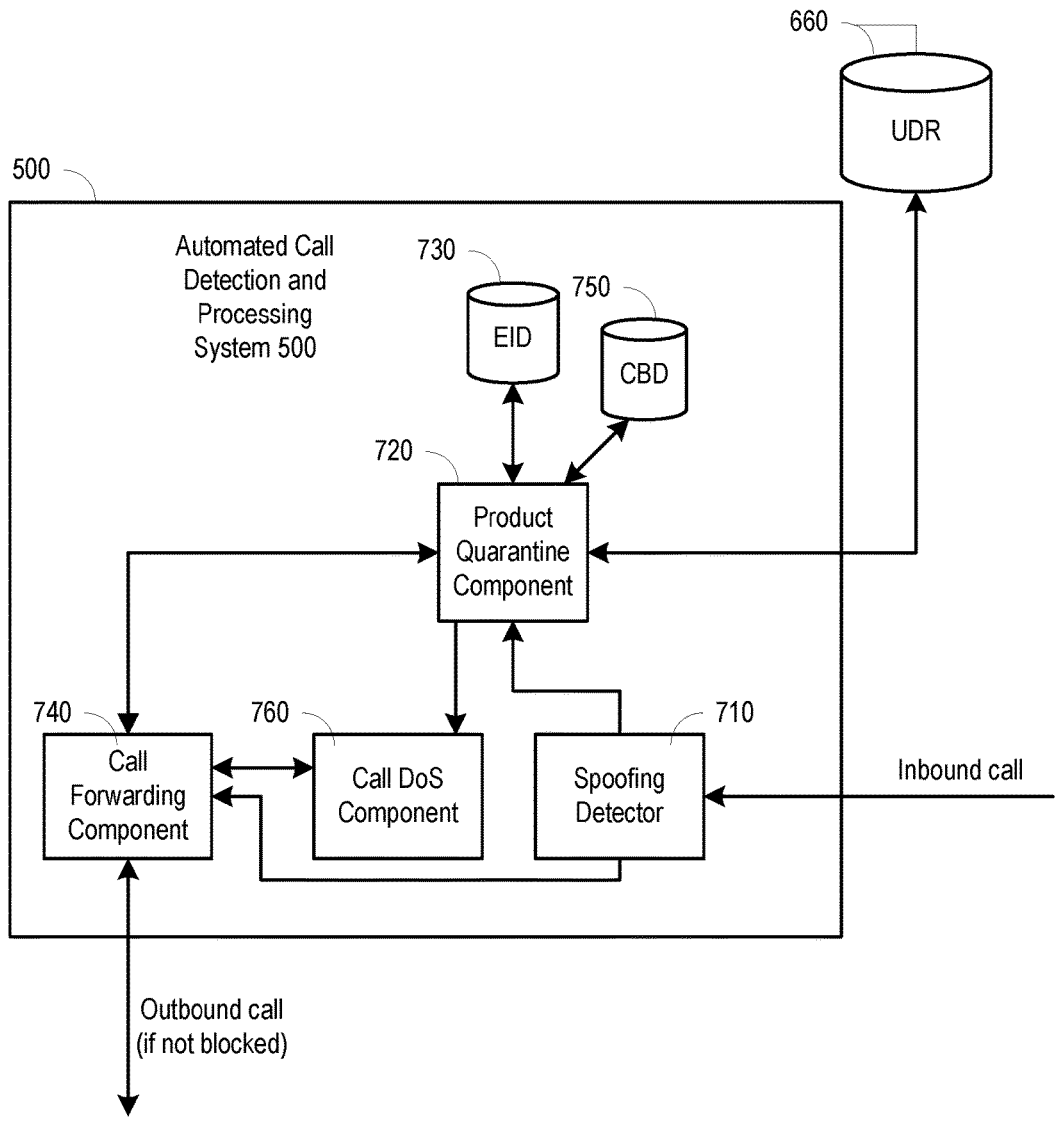
FIG. 7 is a block diagram illustrating an example automated call detection and processing system in accordance with various aspects and embodiments of the subject disclosure.

FIG. 7 illustrates a block diagram of an example automated call detection and processing system 500 that facilitates operations comprising the identification, authentication, and blocking of automated calls. The system 500 can comprise a spoofing detector 710, for facilitating the identification of automated calls. The spoofing detector 710 can receive incoming calls, and determine whether an originating number associated with the call matches a caller ID number associated with the call. If an automated dialer (e.g., automated dialer 210) used a caller ID spoofer (e.g., caller ID spoofer 310) to present a caller ID number different from the originating number of the called party, then the likelihood of the call being a vexatious or malicious automated call increases. In a typical communications system, one or more switches, which can reside within a switching center, performs the switching necessary to interconnect calls between user devices. When a calling party contacts a called party, a request from the user's telephone is sent to network (e.g., network 110) to make a connection with the called party. As is known in the art, the number from which the call originates (e.g., the originating number) is referred to as the "A number" and the called party's number is termed the "B number." Typically, a "B number analysis" is performed whereby a switch uses the A number and B number to determine the better path to route the call. Although a caller ID number can be spoofed, the underlying A number of the call remains and is not only used for routing purposes, but is also associated with the calling party's account for billing purposes (which can be stored in, for example, a UDR 660).

In example embodiments in accordance with the present application, the functionality of the automated call detection and processing system 500, or in some example embodiments the spoofing detector 710, can reside within a switch. The spoofing detector can be operable to, in conjunction with the switch's B number analysis, use the A number to determine whether the A number matches the caller ID number of the call. If the caller ID number associated with the call does not match up with the calling party's originating number, then this is an indication that the originating number has been spoofed. In response to a determination that the originating number has been spoofed, the system 500 can perform further analysis to determine whether the call is one of a group of calls consistent with calls made by an automated dialer. Automated dialers typically place an exorbitant number of calls. One characteristic of auto dialed calls are that there are no significant pauses between the calls. As another example, calls coming from an automated dialer are in a sequence, a range, or a block (as mentioned above). The system 500 can determine, based on an aggregate number of calls having the originating number, whether calls associated with that originating number exhibit the characteristics of automated calls.

Still referring to FIG. 7, in response to a determination by the spoofing detector that the call is one of a group of calls from the automated dialer that exhibit the characteristics of automated calls, a profile quarantine component 720 can processes anomalous profiles that can use more examination and approval. It can determine whether the originating number corresponds to a number of a legitimate calling party, or whether the originating number is a blacklisted number (i.e., determined to belong to a party that originates vexatious or malicious robocalls) by querying one or more databases, which may reside in one or more data stores. The profile quarantine component 720 can query an entity identity database EID 730, wherein the EID contains entries for legitimate government identities or official identities that are allowed to initiate robocalls for various reasons such as public safety, national security, and political polling. If the originating number matches an entry in this database, the call can be directed to a call forwarding component 740 which forwards the call to be connected with the intended called party UE.

Still on FIG. 7, if the originating number does not match an entry in the EDI 730, the profile quarantine component 720 can be further operable to query a caller blacklisted database CBD, which can contain entries relating to identified and verified blacklisted profiles. The CBD 750 can be a dynamic database that is continuously updated with the originating numbers from which automated calls are made. The updates can be based upon the submissions of called party identities indicating that the call is an unwanted robocall (e.g., crowdsourced). The originating number can be used to determine the name of the calling party identity. The calling party identity can be determined, for example, by querying the UDR 660 to determine the name of the called party associated with the originating number, as the UDR 660 can contain not only information related to the called party, but also information related to the calling party. A database entry for that calling party identity can have associated with it numerous originating numbers. Each originating number can be associated with the calling party identity, and each calling party identity can have numerous originating numbers associated with it.

As an example, a determination can be made that the originating number is associated with the Ajax Marketing Company, and further that the Ajax Marketing Company might have five originating numbers that it has been using to make automated calls. Each time a called party identity reports one of the originating numbers as being a robocall to be blocked, an entry can be created in the profile for Ajax Marketing Company. If the aggregate number of entries of originating numbers associated with Ajax Marketing Company reaches a certain threshold number (e.g., 200 entries), then future calls from Ajax Marketing Company, regardless of which automated number Ajax Marketing Company uses to dial, can result in automated calls from Ajax Marketing Company being blocked.

The CBD 750 can also store entries for originating numbers associated with called parties that have been subject to criminal investigation, or that have been added based on consumer complaints to the federal communications commission (FCC).

Additionally, the profile quarantine component 720 can query a UDR (e.g., UDR 660) to determine whether the originating number is associated with an entry stored in the UDR 660 under the called party identity's profile. This entry can be based upon the submissions of the called party UE 220 indicating that the call is an unwanted robocall.

Still referring to FIG. 7, in response to a determination by the product quarantine component 720 that the originating number is associated with a blacklisted entry that is in either in the CBD 750 or in the URD 660, the product quarantine component 720 can communicate with a call denial of service (CDoS) component 760 that handles blocking of the call. The system 500 can be operative to block the call. The system can also divert the call by connecting it with a voice messaging service that answers with a "do not call" message. An IVR service can also be used to emit a dial tone of "2" signifying to the automated dialer 210 that the called party wishes to be removed from the automated dialer 210's calling list.

In response to a determination by the product quarantine component 720 that the originating number does not appear in any blacklist database (e.g., contained in the CBD 750 or UDR 660), in some example embodiments, the system 500 (e.g., the product quarantine component 720, or the call DoS component 760) can be operative to further determine whether a condition that precludes connection of the automated call is present. The system 500 can determine this based on, for example, whether the called party identity's preference data related to the originating number is applicable to the automated call. The preferences can be stored in, for example, UDR 660 under the called party identity's account. The preferences can relate to a condition such as an event or activity in which the called party identity is engaged (which can be derived, for example, from a sensory device coupled to the called party UE), or it can relate to a time and a place, which might be presence information derived from a global positioning system (GPS), or a calendar entry from the called party UE (e.g., the calendar entry can also indicate an event or activity as well). A condition can also comprise whether the called party identity UE, or a sensory device, is executing an application (e.g., a game, sleep monitoring app, lap tracking app, etc.). If the condition, which can be determined from a synthesis of some or all of the various information, is present, the system 500 can be operative to store the automated call's recording for access by, or delivery to, the called party UE at another time.

If the condition is not present, the product quarantine component 720 can communicate with the call forwarding component 740 to process the call and connect the calling party identity with the called party identity. In this situation, a call that had been determined to have been identified by the spoofing detector 710 to be an automated call, and been further investigated by the product quarantine component 720 as not originating from a blacklisted identity, has been allowed to proceed with connection establishment. In response to the condition being absent, the system 500 can proceed with establishment of the call. In some example embodiments, the system 500 can be operative to replace a caller ID number, if spoofed, with the actual originating number of the automated dialer 210.

After establishment of an allowed automated call with the called party UE 220, the called party identity can still block future calls from the calling party. For example, the called party UE 220 can provide the called party identity with options to block the automated call from the calling party, as described below with respect to FIG. 9 and FIG. 10. In response to an indication that the called party wishes to block future calls from the called party initiating the robocall, the called party UE 220 can send a message back to the system 500. The system 500 can store the originating number in a blacklist entry in the CBD 750. As mentioned above, if enough called party identities indicate that they would like to have the number blocked, then at some point (e.g., after reaching a threshold number of indications to block), the originating number, as well as any other originating numbers belonging to the calling party identity associated with the originating number, can be blacklisted. As a result, the next time a call is made by the automated dialer 210, any calls initiated by the calling party identity can be blocked.

Still referring to FIG. 7, additionally, when a called party UE 220 sends a communication back to the system 500 indicating that an originating number should be blocked, the system 500 can also update the called party identity's blacklist, which can be stored as part of the called party's profile in UDR 660, so that future calls to the called party from this originating number can be blocked by the system 500. The system 500 can also be operable to identify the calling party identity, and determine whether other originating numbers belong to the calling party identity; those other originating numbers can also be added to called party identity's blacklist.

Figure 8:
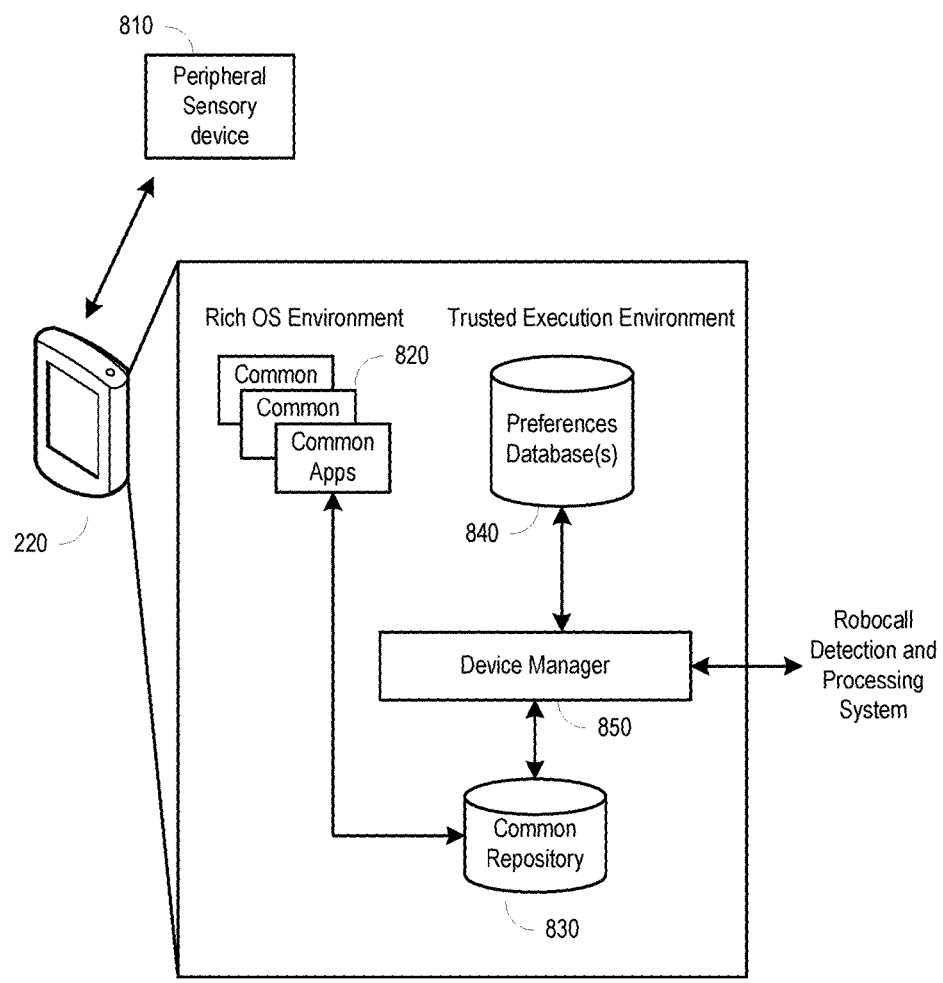
FIG. 8 is a block diagram illustrating a called party user equipment in accordance with various aspects and embodiments of the subject disclosure.

FIG. 8 illustrates a block diagram of example embodiments of a called party UE 200 that can be operable to receive and process an automated call. In addition to being operable to transmit blocking preferences as mentioned above (e.g., which automated calls should be blacklisted entries), in some embodiments, the called party UE 200 can be operable to transmit preferences related to acceptance or denial of an automated call, and other collected data. The system 500 can use this information to determine the disposition or treatment of an automated call (e.g., allow, block, delay delivery of a robocall message) based on the presence of conditions. In other example embodiments, the called UE 200 can be operable to, based on user preferences and the presence of a condition, transmit to the system 500 a request to deny an automated call. In yet other example embodiments, the called UE 200 can be operable to, based on user preferences and the presence of a condition, deny an automated call, wherein denying the call comprise block the call, or directing the automated call to, for example, the called party identity's voice mail. The called party UE device can provide a called party identity with the ability to customize the conditions (e.g., time, place, activities engaged in) that the called party identity wishes to deny automated calls that it would otherwise desire to receive. For example, a called party entity can prevent an automated call (e.g., a political poll) from disturbing the called party entity when the called party entity is jogging, taking a nap, or doing homework with the kids.

In FIG. 8, a called party UE 220 can be operable to communicate with the automated call detection and processing system 500, and also communicate with a peripheral sensory device 810, which can be, for example, a smartwatch, wearable sensor, a fitness tracker (e.g., commercially available products such as a Fitbit Flex 2, Fitbit Surge, Garmin Vivosmart HR, MisFit Ray, Jawbone UP3, etc.). One or more of such sensory devices can be operable to determine a heart rate of the user identity based on heart beat measurements associated with the called party identity, or operable to determine sleep statistics based on biometric measurements associated with the user identity (e.g., called party identity). One or more of such devices can also track steps, laps, calories burned, as well as a variety of other information. Additionally, some peripheral sensory devices are also equipped with GPS. The called party UE 220 can have, for example, one or more software applications (e.g., common applications that can be downloaded and installed from the Microsoft Store, Android Play Store, or Apple App Store) that are installed on top of the called party UE 220's rich operating system (OS) environment (e.g., Android OS, Apple's IOS, Windows, etc.). The called party UE 220 can have a repository 830, which can also be in a trusted execution environment, that can store application data (for example, application data collected by an application that communicates with a peripheral sensory device). The called party UE can have one or more preferences databases 840 that can store user preferences in a trusted execution environment (TEE) related to the called party UE 220's processing of robocalls. The called party UE can also have a device manager 850 that can coordinate all the functions on the phone, including denying a call based on the user preferences.

Still referring to FIG. 8, a called party identity can set preferences for automated calls that the called party identity has already approved of receiving. The preferences can be stored in, for example, preferences database 840. The preferences can relate to conditions under which an automated call might not be connected with the called party UE 220. As an example, the called party UE 220 can be operable to receive input from a called party identity indicating that if an automated call from a particular calling party identity occurs while he or she is engaged in a particular activity (e.g., running, swimming, hiking) or event (e.g., piano recital), then the call is to be denied. The called party identity can specify other conditions related to the activity or event. For example, the called party identity can specify that a particular automated call should be denied if the called party identity is running at a particular time at a particular location. The called party UE 220 can also be operable to receive input as to whether to an automated call based on calendar entries on the user's phone. The called party UE 220 can be operable to receive preferences as to whether to deny an automated call based on a particular day, or time of day. The called party UE 220 can be operable to receive preferences as to whether to deny an automated call based on the location of the called party UE 220. The automated call preferences can be stored locally in the called party UE 220 in preferences database 840. In some example embodiments, the preferences can also be stored in the called party's account in a network data store (e.g., UDR 660), and synced with the preferences stored locally in the preferences database 840.

Still referring to FIG. 8, data related to a particular activity, event, time, or location can be stored in one or more local repositories (e.g., common repository 830) by one or more common apps 820. As an example, a calendar app can store calendar entries in a local data store on the called party UE 220. As another example, the common application can be a fitness related application (e.g., a Fitbit app) that receives information from a peripheral sensory device 810, such as the number of laps that the called party identity is swimming, and stores the lap-counting information in common repository 830. Other data can be heart rate, location information, sleep stats, number of steps. In example embodiments, a sensory component integrated with the phone (instead of peripheral to the phone) can also be used.

In example embodiments, the device manager 850 can access the automated call preferences in preferences database 840, and also access common application data stored in common repository 830, to determine whether a condition is present that would result in an automated call being denied in response to that condition. As an example, the device manager 850 can determine that a called party identity preference that he or she not be disturbed by an automated call related to presidential polling while the called party identity is swimming at LA fitness, taken into account with data from the common repository 830 that indicates that a peripheral sensory device 810 is currently counting laps, and with GPS data that indicates that the called party identity is at LA fitness, leads to a condition in which an automated call related to presidential polling be denied. As another example, the device manager can determine from the active presence of sleep stats from a peripheral sensory device 810 that the called party identity is sleeping, or that a highly-elevated heartrate indicates that he or she is engaged in some type of physical activity.

Still on FIG. 8, the device manager 850 can also make a determination that a condition is present based on the preferences and the keywords from calendar entries. For example, in the event that the called party identity had scheduled on his or her calendar app the keywords "Swimming at LA Fitness" from 3-4 PM, when chronological data indicates that the time is 3-4 PM, and the calendar entry indicates that the called party identity has scheduled "Swimming at LA fitness" and GPS data indicates that the called party identity UE 220 is located at LA fitness, the device manager 850 can determine that the condition is present, and process the call accordingly (e.g., deny the call by blocking the call, or deny the call by directing the automated call to the called party identity's voice mail service).

In the same way that the device manager 850 can use preferences and common application data stored locally to determine whether a condition exists that would result in denial of an automated call, a network device component (e.g., the call DoS component 760, or the product quarantine component 720), can also make this determination based on preferences and application data stored in the network (e.g., stored in UDR 660), and be operable to deny the automated call.

Still referring to FIG. 8, denial of the call due to the presence of a condition, whether locally by the device manager 850 or by a network component (e.g., the call DoS component 760, or the product quarantine component 720) can be implemented in a variety of different manners. The call denial can be a block of the call, in which case a communication (e.g., a message from the device manager 850, or a component within the system 500) can be sent to, for example, the automated call detection and processing system 500 instructing the system 500 not to connect the automated call. The call denial can be that the device manager 850 directs the automated call to the called party's voice mail service, and not generating an alert on the called party UE 220 (e.g., no rings, no vibrations, no indication of caller). The called party identity can choose whether to receive a notification (e.g., a message that appears on the display of the called party UE 220) when the call has been directed to voice mail, or a choose that the notification of a robocall message when the condition is no longer present (e.g., an on-screen notification that an automated call from the First United Methodist Church occurred during the called party identity's swim, and that a voicemail has been saved).

As mentioned above, a called party UE 220 can be operable to allow input of preferences for automated calls from a particular calling party entity. The called party UE 220 can also be operable to allow input of preferences for automated calls in general. For example, even if a call has been determined to be an automated call, but has not been blacklisted, it can still be subjected to the user's disposition preferences. The qualities of the call (e.g., certain signaling information), from being processed through the control plane by the system 500, can allow the called party UE to determine that it is an automated call (versus non-automated call). As such, the automated call can be subject to the conditional preferences as described above.

Figure 9:
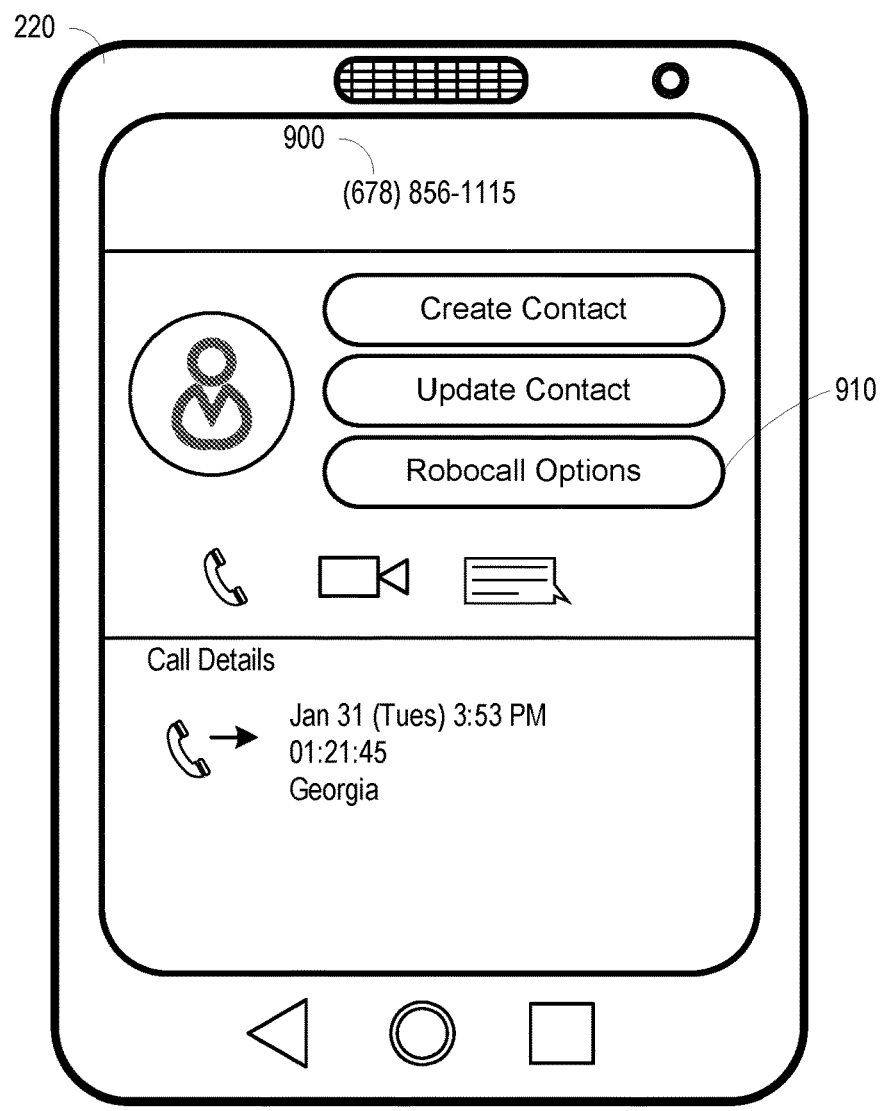
FIG. 9 and FIG. 10 illustrate example graphical user interfaces (GUIs) in which a called party user equipment displays options to a user for managing robocalls directed at the called party user equipment, in accordance with various aspects and embodiments of the subject disclosure.

FIG. 9 illustrates an example GUI in which a called party UE 220 can be operative to present a called party identity with a prompt to manage options related to the processing of the originating number of an automated call. In response to a determination by the automated call detection and processing system 500 to process an automated call and connect the calling party identity with the called party identity, a called party UE 220 might ring to alert a user of the call. The called party identity might answer the call and experience one or more of the steps as shown in FIG. 4. The called party UE 200 can be operable to display a call log entry showing a log entry for the automated call. In response to the called party identity selecting the call log entry, the called party UE 220 can display a GUI as shown in FIG. 9 that shows the called party identity's originating number 900. As mentioned above, system 500 can be operable to replace any spoofed caller ID number with the actual originating number that made the call, but here, the system 500 replaced the spoofed caller ID number with the originating number.

While a typical phone can have options to create a contact for the originating number 900, or update a contact so as to associate the originating number with an existing contact, in example embodiments of the present application, the called party UE 220 can be operable to display a "Robocall Options" button 910. Upon selection of the robocall options button 910, the called party UE 220 can be operable to display the interface show in FIG. 9.

Figure 10:
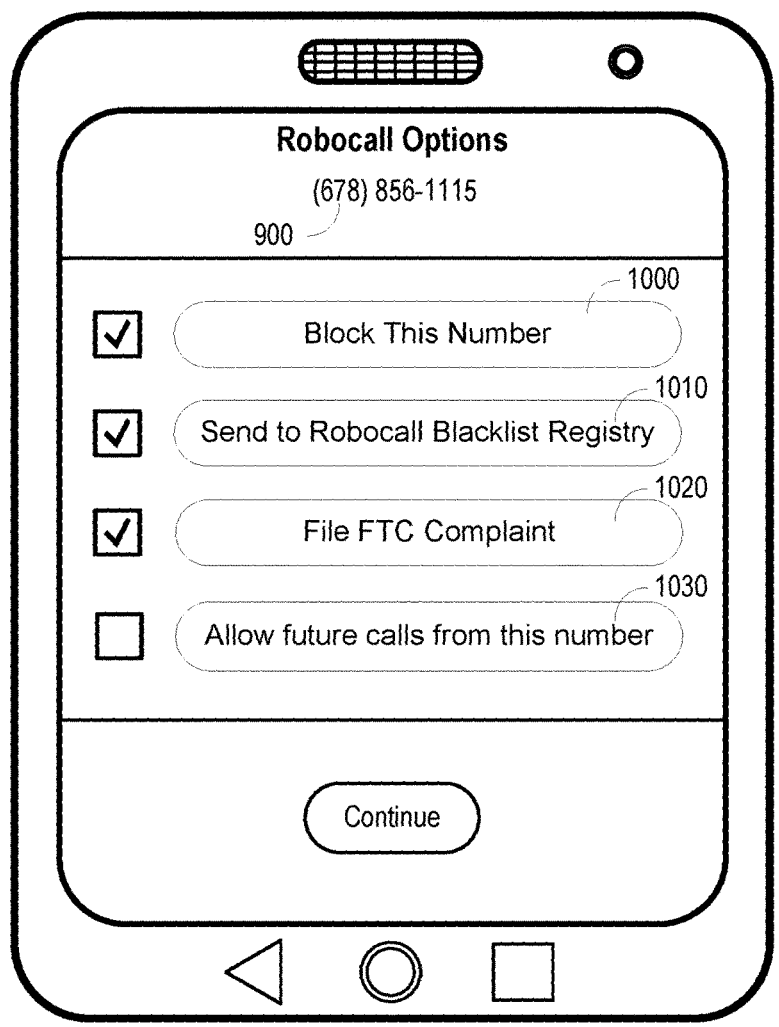

FIG. 10 illustrates an example GUI in which a called party UE 220 can be operative to present a called party identity with several prompts related to options for responding to an automated call.

If the called party identity selects the "block this number" option 1000, the called party UE 220 can be operable to send a communication to the automated call detection and processing system 500 indicating that the originating number 800 (e.g., 678-856-1115) should be blocked. The system 500 can also update the called party identity's blacklist, which can be stored as part of the called party's profile in UDR 660 in the network 110, so that future calls to the called party from this originating number can be blocked at the network level, as opposed to the device level. The system 500 can also be operable to identify the calling party identity, and determine whether other originating numbers belong to the calling party identity; those other originating numbers can also be added to called party identity's blacklist.

Still referring to FIG. 10, if the called party identity selects the "Send to Robocall Blacklist Registry," button 1010, the system 500 can respond to the communication to block the originating number 800 by updating the CBD 750, which contains entries based on requests to block from a plurality of called parties. If the called party identity does not believe the automated call to be vexatious or malicious, he or she can choose to block the call, but choose not to send a communication that might result in all future calls from the calling party being blocked.

The called party device 220 can also be operable to display to the called party identity an option to initiate the filing of an FTC complaint regarding the automated call. For example, a user can select a "File FTC Complaint" button 1020. After receiving a user input selecting this option, the called party device 220 can automatically present a step-by-step "wizard" interface to obtain information from the called party identity that the FTC typically seeks to obtain when an identity files a complaint regarding robocalls. For example, the first screen might have the categories of "telemarketing—unwanted telemarketing calls on a landline or mobile device", or "the call in question was a pre-recorded call, commonly known as a robocall" already selected in response to the called party's selection of button 1020. The wizard can be operative to enable the called party to input other details as well, as such as the contact date, phone call, how much did the telemarketer ask the consumer identity to pay, how much did the consumer actually pay, how did the consumer respond to the contact, etc.

Still referring to FIG. 10, the called party device 220 can also be operable to display to the called party identity an option to "Allow future calls from this number" 1030. A called party identity can select this option so as to "whitelist" the number. In example embodiments, the called party identity's selection can be stored in the network 110 (e.g., in the UDR 660), and the product quarantine component 720 can be operative to query the UDR 660 for future calls from the originating number. Here, the called party identity can choose to receive robocalls, even if other called parties have identified and reported the originating number as a vexatious or malicious robocall.

Figure 11:
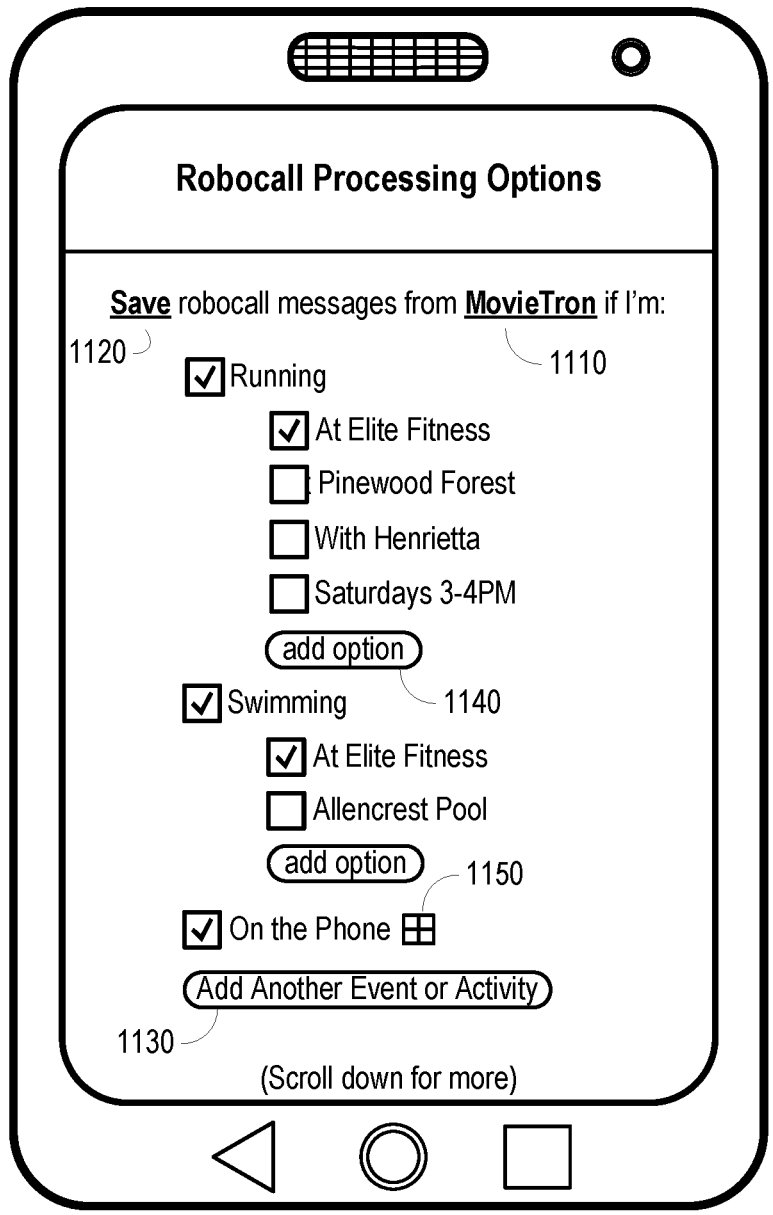
FIGS. 11-16 illustrate example graphical user interfaces relating to a called party user equipment that can be operable to accept user preferences related to automated calls in accordance with various aspects and embodiments of the subject disclosure.

Moving to FIG. 11, in response to a selection of the "Allow future calls from this number" 1030, the called party UE 220 can be operative to present further processing options for a particular automated call. In the example shown in FIG. 11, the called party identity can set preferences for automated calls from a calling party identity (in this case, MovieTron, which might be a robocall service that notifies a user of when a particular movie arrives at a particular theater). The called party UE 220 can be operative to display the name of the calling party associated with the automated dialer 1110. The called party UE can also display a disposition option 1120 to enable denial options for a particular automated call. In this example, the called party UE has elected to save robocall messages from MovieTron. If the called party identity selected the disposition option 1120, which can be a linked selector, by clicking on it. In response to selection of the disposition option 1120, for example, the called party UE 220 can present options to the user to save an automated call's message for later, or an option to block automated calls from the called party identity for the preferences shown. In the example shown, the called party identity has selected a preference for robocalls to be saved if the called party identity is engaging in certain activities or in the middle of certain events. (e.g., running at Elite Fitness, swimming at Elite Fitness, or On the Phone). The called party UE 220 can be operable to allow the called party entity to add one or more activities or events, for example, by clicking on the "Add Another Event or Activity" button 1130. The called party UE 220 can be operable to allow the called party entity to add one or more options for each event or activity (e.g., by selecting the "add option" button 1140). For example, for the activity "running," the called party identity can select further preferences related to location, time and date in which robocall messages would be saved for later. As mentioned above, these conditions can be determined based upon peripheral sensory devices 810, GPS data, clock data, or calendar entries, and calendar entry keywords. If an activity has more than one option related to it, a called party identity can select an expander 1150 to see the options related to a particular event or activity.

Figure 12:
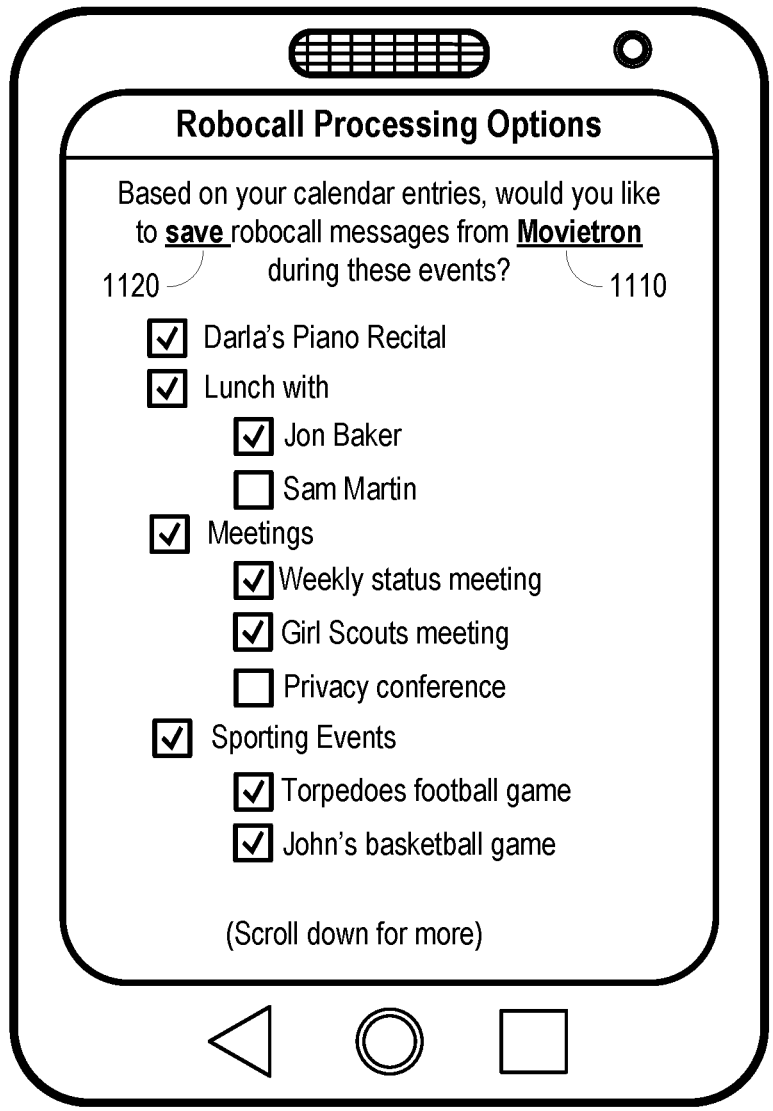

FIG. 12 illustrates an example GUI in which the called party UE 220 can be operable to display a list of events derived from calendar entries stored on the called party UE 220. The GUI presents a called identity with the option to save (or block) robocalls from a particular calling identity (e.g., MovieTron) during certain events. The called party identity can select (e.g., via a check box) the activities or events, as well as additional conditions. The called party UE 220 can be operative to display events or activities based on the category of the event (e.g., lunches, sporting events, meetings).

Figure 13:
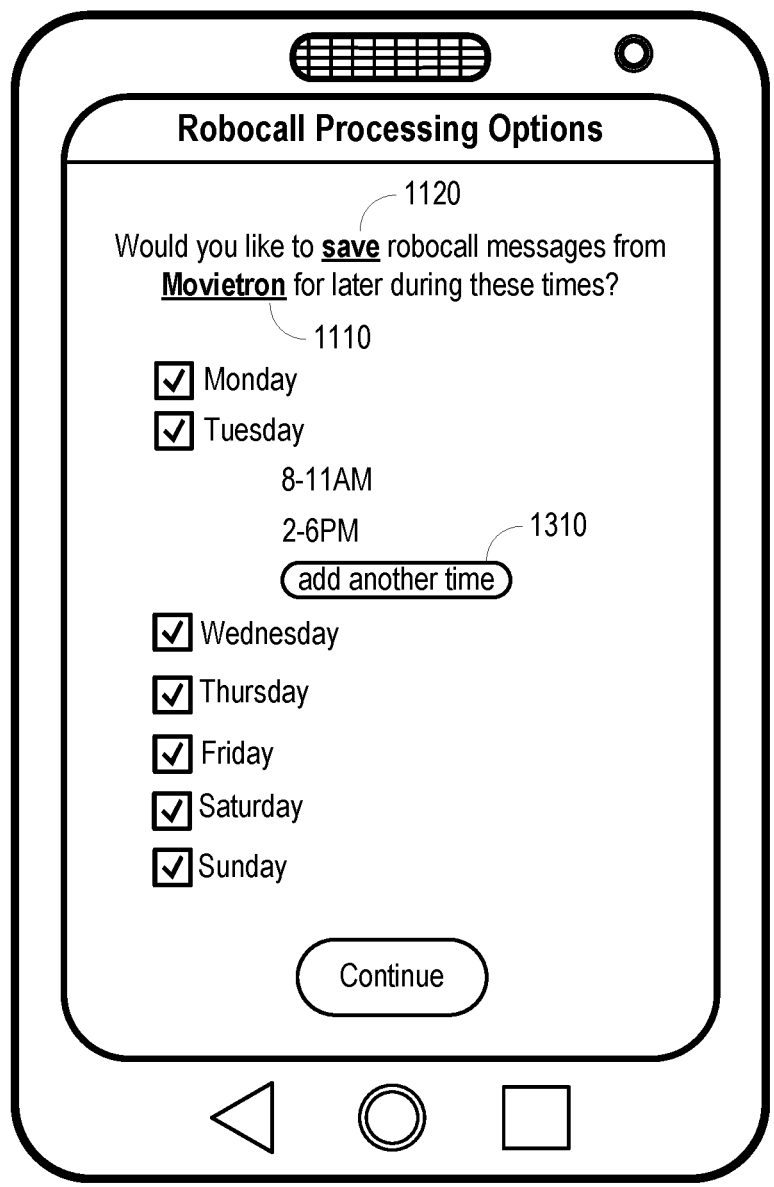

FIG. 13 illustrates an example GUI generated by the called party UE 220 that allows a called party to determine whether to save (or block) automated calls from a particular called party identity based on time (e.g., particular days, hours, or even months). In the example shown, the called party UE 220 presents a list of each day, and under each day, the called party UE 220 displays the times during that day that the preference would apply, with the user being able to add additional times for each day (e.g., by selecting the "add another time" button 1310). While not shown, the called party UE 220 can present a variety of other GUIs to enable a user to select times in which automated calls would be denied. For example, the called party UE 220 can generate a calendar (e.g., with a monthly or daily view) that can allow for a called party entity to select blocks of days, or select blocks of hours.

Figure 14:
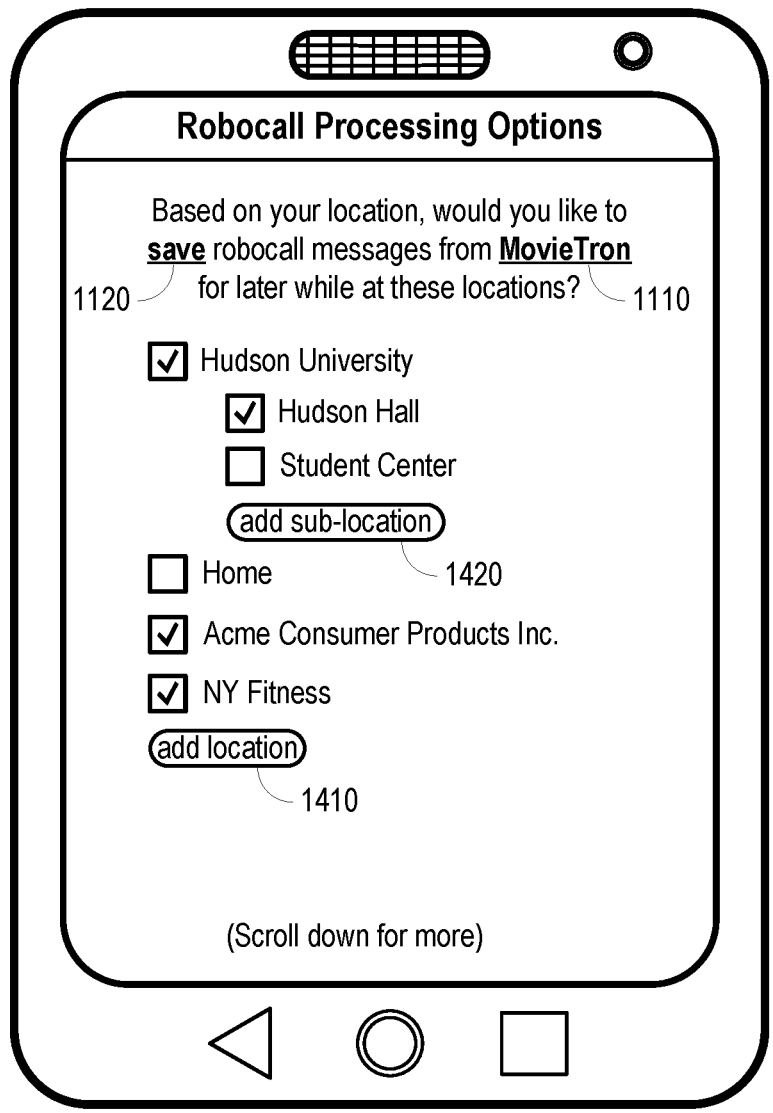

FIG. 14 illustrates an example GUI in which a called party can set preferences for automated call denial based on the location of the called party UE. The called party UE can be operable to allow a called party identity to add locations (e.g., "add location" button 1410) at which the called party does not want to receive an automated call. In the example shown, in response to a called party identity selecting the add location button 1410, the called party UE 220 can display an entry field for the user to enter a name of a location or an address, or a map from which the called party identity can select a location. For each location, the called party identity can be operative to allow the input of a sub-location (e.g., using the "add sub-location" button 1420. In the example shown, a called party identity can select different locations on the campus of Hudson University.

Figure 15:
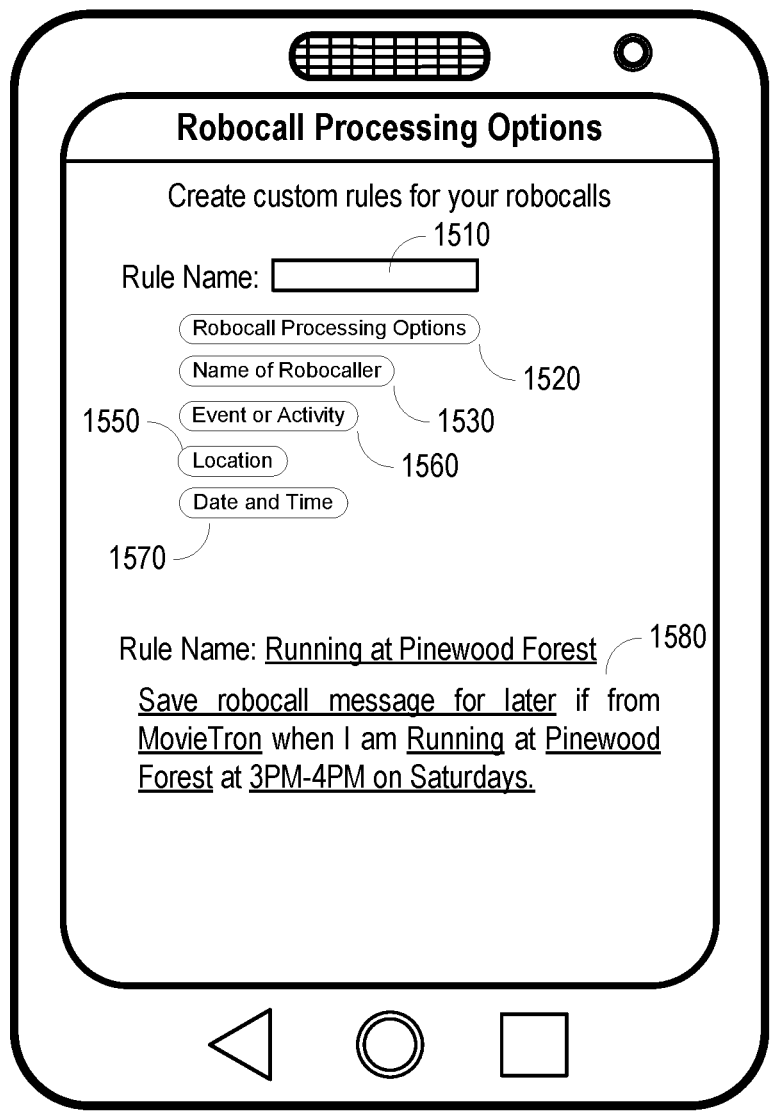

FIG. 15 depicts another GUI showing an example embodiment in which the called party UE 220 can be operative to enable a user to create preferences for the processing automated calls using a rules-based approach. For example, the GUI can present selectors (e.g., buttons) that when selected, bring about options that serve to specify (or narrow) the scope of the rule. The called party identity can enter the name for a rule having preferences in rule name field 1510. Selecting "Robocall Processing Options" 1520 can enable a party to select how he or she would like to have the automated call processed (e.g., block, save robocall message for later) based on the preferences for the rule. Selecting the "Name of Robocaller" can bring up a list of all the automated callers that the called party identity is subscribed to (e.g., allows), and the called party identity can select one or more calling parties associated with automated calls. The "Event or Activity" button 1560, "location" button 1550, and "date and time" button 1570 allow the called party to further specify an event or activity, a location, or a date and time that would be subject to the preferences. In the example shown, a displayed rule 1580 can show preferences for each rule. Here in FIG. 15, the rule for "Running at Pinewood Forest" has been displayed, whereby an incoming robocall from MovieTron would be denied, and the voice message of the robocall would be saved to be played later, if the called party identity is running at pinewood forest at 3-4 PM on Saturdays. If the called party identity did not specify a particular calling party identity, or did not specify a date and time, then the example rule would be to save robocall messages if the called party identity is running at Pinewood Forest, which is broader than the preferences displayed in 1580.

Figure 16:

FIG. 16 displays an example GUI that would allow called party identities to display the options related to one or more robocall calling party. For example, if a called party identity selected the "MovieTron" link, the called party identity can see one or more rules having preferences related to MovieTron. The called party UE 220 can also be operable to show a list of the allowed robocalls that are not configurable (e.g., robocalls related to emergencies or security).

Figure 17:
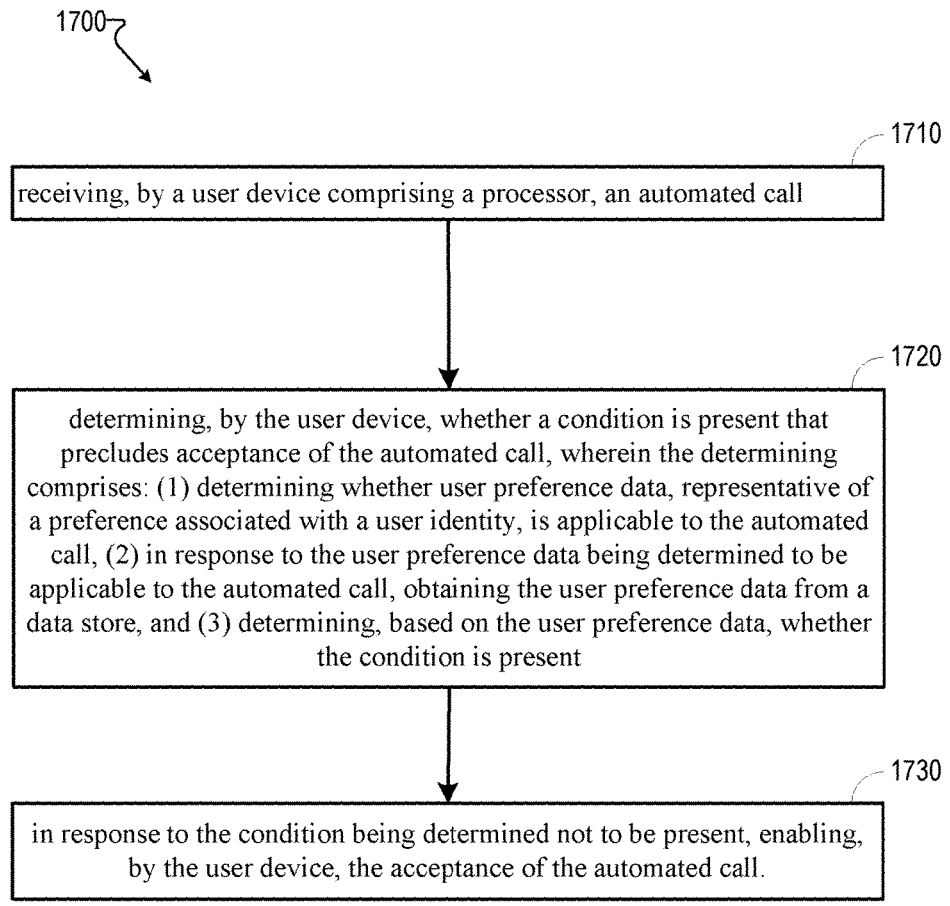
FIG. 17 illustrates an example method for performing operations that facilitate determining whether a condition that precludes acceptance of the automated call is present in accordance with various aspects and embodiments of the subject disclosure.

Moving on to FIG. 17, in example embodiments, a method performed by a user device (e.g., called party UE 220) comprising a processor can facilitate performance of operations as illustrated in flow diagram 1700 of FIG. 17. At step 1710, the operations can comprise receiving an automated call.

The operations can at step 1720 comprise determining, by the user device, whether a condition is present that precludes acceptance of the automated call, wherein the determining comprises (1) determining whether user preference data, representative of a preference associated with a user identity, is applicable to the automated call, (2) in response to the user preference data being determined to be applicable to the automated call, obtaining the user preference data from a data store (e.g., preferences database 840), and (3) determining, based on the user preference data, whether the condition is present. The user preference data can comprise an indication to deny the automated call based on information received from a sensory device (e.g., peripheral sensory device 810) coupled to the user device, either wired or wirelessly. The sensory device can comprise a device operable to determine sleep statistics based on biometric measurements associated with the user identity (e.g., called party identity) made by the sensory device, and operable to determine a heart rate of the user identity based on heart beat measurements associated with the user identity made by the sensory device. Additionally, the sensory device can be operable to collect information related to a physical activity, such as a sport activity or exercise activity (e.g., steps, laps, etc.). The user preference data can comprise an indication to deny the automated call based on location data (e.g., presence information, GPS provided data) being determined to correlate to the location of the user device. The user preference data can also comprise an indication to deny the automated call based on a calendar entry associated with the user identity, and the determining whether the condition is present further can comprise determining whether the calendar entry comprises a keyword that indicates the condition.

At step 1730, the operations can further comprise, in response to the condition being determined not to be present, enabling, by the user device, the acceptance of the automated call.

Figure 18:
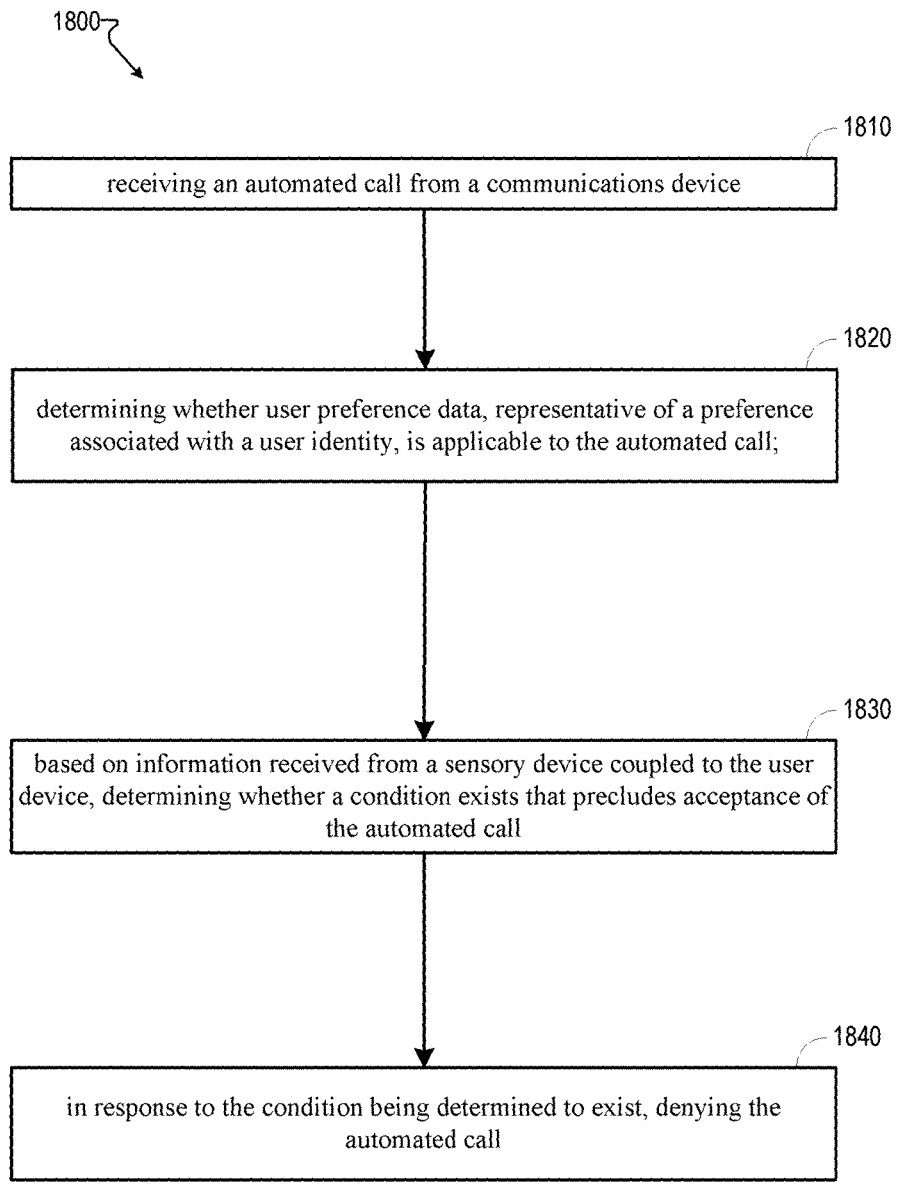
FIG. 18 illustrates an example device operable to facilitate performance of operations for determining whether a condition that precludes acceptance of the automated call is present in accordance with various aspects and embodiments of the subject disclosure.

Referring now to FIG. 18, in example embodiments a device (e.g., called party UE 220), comprising a processor and a memory that stores executable instructions that, when executed by the processor, facilitate performance of operations 1800. The operations 1800 at step 1810 can comprise receiving an automated call from a communications device (which might be an automated dialer).

The operations 1800 can further comprise, at step 1820, determining whether user preference data, representative of a preference associated with a user identity, is applicable to the automated call. For example, the called party UE can identify the call based on the originating number of the call (as the system 500 has replaced any spoofed number with the actual originating number), and use that number to query a database to determine whether any stored user preferences are associated with the number.

In step 1830, the operations 1800 can further comprise, based on information received from a sensory device coupled to the user device, determining whether a condition exists that precludes acceptance of the automated call. For example, the information from the sensory device can comprise a heart rate of the user identity based on heart beat measurements associated with the user identity made by the sensory device. The information from the sensory device can indicate that the user identity is engaged in a physical activity such as a sport activity, or an exercise activity. As another example, the information from the sensory device can comprises location data (e.g., GPS provided data), and wherein the location data correlates to the location of the user device. The user preference data can comprise an indication to deny the call based on the location data.

At step 1840, the operations 1800 can further comprise, in response to the condition being determined to exist, denying the automated call. Denying the automated call can comprise blocking the automated call. Denying the call can also comprise directing that a message related to the automated call be stored for future access (e.g., directing the call to the called party identity's voice mail service, whereby the automated dialer, once connected, can leave a message for the called party identity).

Figure 19:
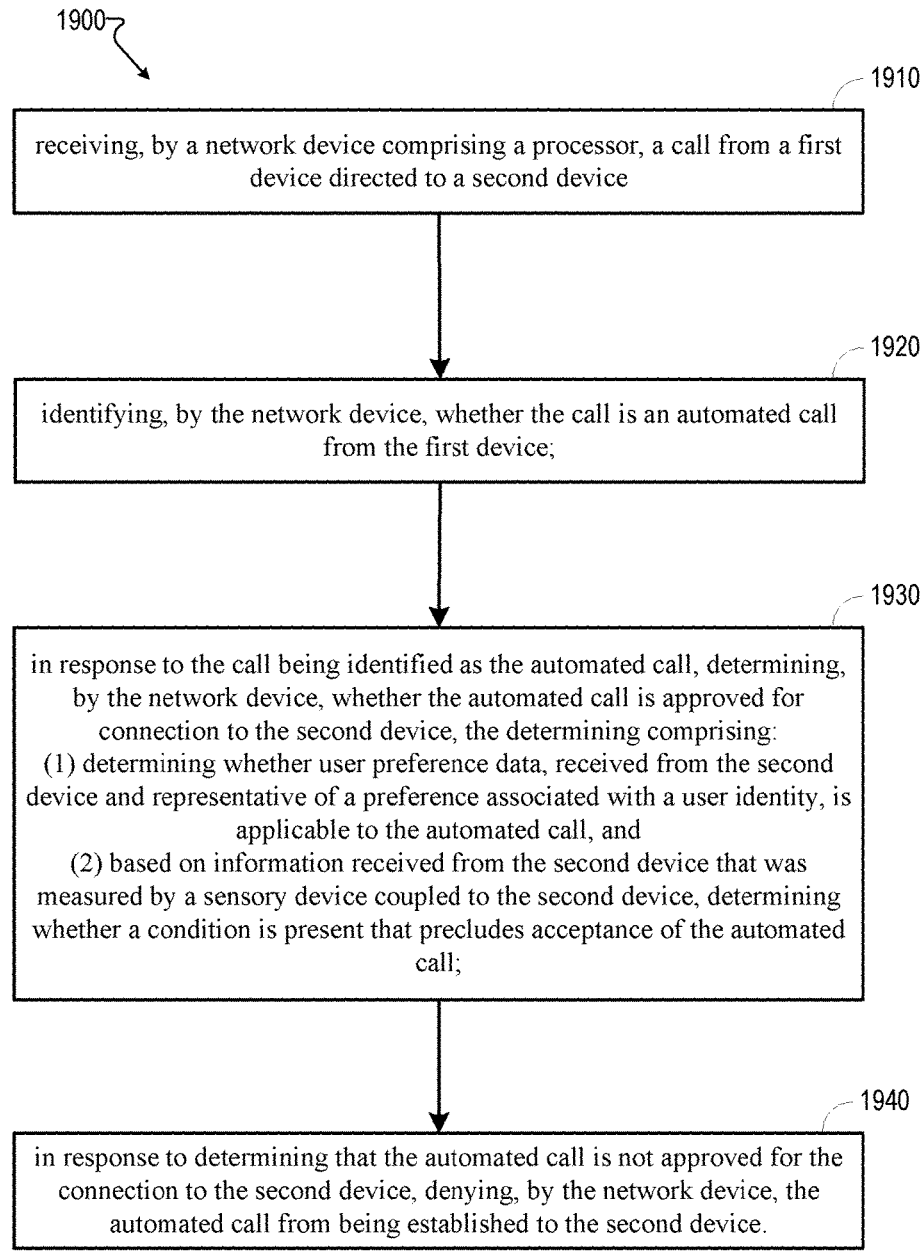
FIG. 19 illustrates an example method for performance of operations related to determining whether a condition that precludes acceptance of the automated call is present in accordance with various aspects and embodiments of the subject disclosure.

Moving on to FIG. 19, in example embodiments, a method performed by a network device (e.g., a server, a switch, etc.) comprising a processor can facilitate performance of operations as illustrated in flow diagram 1900 of FIG. 19. At step 1910, the operations can comprise receiving a call from a first device (which might be an automated dialer) directed to a second device (e.g., called party UE 220).

At step 1920, the operations can further comprise identifying, by the network device, whether the call is an automated call from the first device. As mentioned above, this can be determined, for example, by determining whether the A number matches a caller ID number, and further determining whether the call is one of a group of calls exhibiting automated call characteristics.

At step 1930, the operations can further comprise, in response to the call being identified as the automated call, determining, by the network device, whether the automated call is approved for connection to the second device. In addition to determining whether the automated call corresponds to a blacklisted entity (or a legitimate entity, or otherwise approved by the called party identity), the determining can further comprise (1) determining whether user preference data, received from second device and representative of a preference associated with a user identity, is applicable to the automated call, and (2) based on information received from the second device that was measured by a sensory device coupled to the second device, determining whether a condition is present that precludes acceptance of the automated call. The information from the sensory device can indicate that the user identity is likely to be engaged in a physical activity (e.g., a sport or an exercise).

At step 1940, the operations can further comprise, in response to determining that the automated call is not approved for connection to the second device, denying, by the network device, the automated call from being established to the second device. Denying the automated call comprises blocking the automated call. Denying the call can also comprise directing that a message related to the automated call be stored for future access by the second device (e.g., directing the call to a voice mail service, whereby the automated dialer, once connected, can leave a message, which can be stored on a data store, accessible by the called party UE 220).

Figure 20:
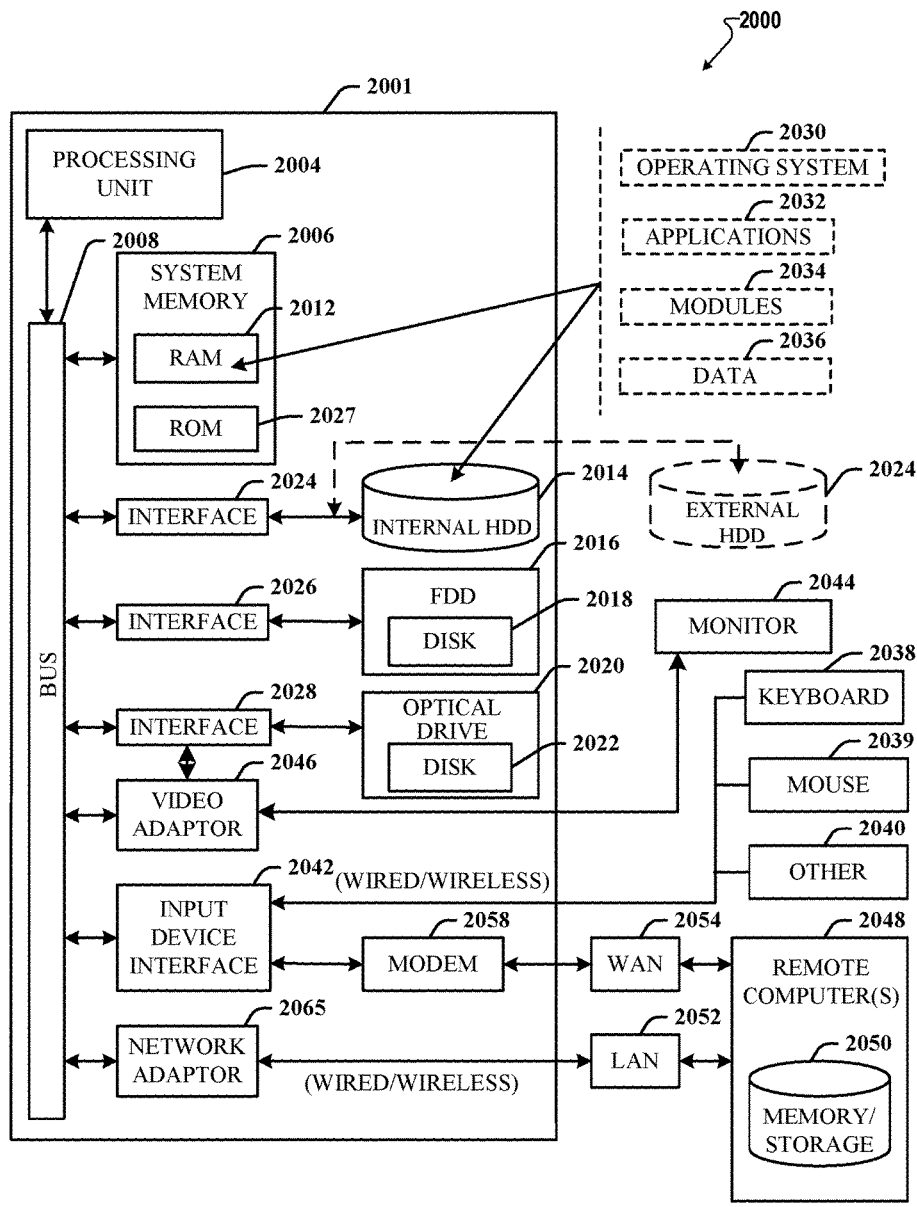
FIG. 20 illustrates a block diagram of an example computer that can be operable to execute processes and methods in accordance with various aspects and embodiments of the subject disclosure.

Referring now to FIG. 20, there is illustrated a block diagram of a computer 2000 operable to execute the functions and operations performed in the described example embodiments. For example, a user device (e.g., called party UE 220), or a communications network system (e.g., automated call detection and processing system 500), can contain components as described in FIG. 20. The computer 2000 can provide networking and communication capabilities between a wired or wireless communication network and a server and/or communication device. In order to provide additional context for various aspects thereof, FIG. 20 and the following discussion are intended to provide a brief, general description of a suitable computing environment in which the various aspects of the various embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network.

In a distributed computing environment, program modules can be located in both local and remote memory data stores.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 20, implementing various aspects described herein with regards to the network devices (e.g., server 120, switch, etc.), UEs (e.g., UE 140, called party UE 220), and user premises devices (e.g., user premise device 230) can comprise a computer 2000, the computer 2000 comprising a processing unit 2004, a system memory 2006 and a system bus 2008. The system bus 2008 couples system components comprising the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 comprises read-only memory (ROM) 2027 and random access memory (RAM) 2012. A basic input/output system (BIOS) is stored in a non-volatile memory 2027 such as ROM, EPROM, EEPROM, which BIOS contains the basic routines that help to transfer information between elements within the computer 2000, such as during start-up. The RAM 2012 can also include a high-speed RAM such as static RAM for caching data.

The computer 2000 further comprises an internal hard disk drive (HDD) 2014 (e.g., EIDE, SATA), which internal hard disk drive 2014 can also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 2000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 2000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 2012, comprising an operating system 2030, one or more application programs 2032, other program modules 2034 and program data 2036. All or portions of the operating system, applications, modules, and/or data can also be cached in the RAM 2012. It is to be appreciated that the various embodiments can be implemented with various commercially available operating systems or combinations of operating systems.

A user can enter commands and information into the computer 2000 through one or more wired/wireless input devices, e.g., a keyboard 2038 and a pointing device, such as a mouse 2039. Other input devices 2040 can include a microphone, camera, an IR remote control, a joystick, a game pad, a stylus pen, touch screen, biometric reader (e.g., fingerprint reader, retinal scanner, iris scanner, hand geometry reader, etc.), or the like. These and other input devices are often connected to the processing unit 2004 through an input device interface 2042 that is coupled to the system bus 2008, but can be connected by other interfaces, such as a parallel port, an IEEE 2394 serial port, a game port, a USB port, an IR interface, etc.

A monitor 2044 or other type of display device can also be connected to the system bus 2008 through an interface, such as a video adapter 2046. In addition to the monitor 2044, a computer 2000 typically comprises other peripheral output devices (not shown), such as speakers, printers, etc.

The computer 2000 can operate in a networked environment using logical connections by wired and/or wireless communications to one or more remote computers, such as a remote computer(s) 2048. The remote computer(s) 2048 can be a workstation, a server computer, a router, a personal computer, portable computer, microprocessor-based entertainment device, a peer device or other common network node, and typically comprises many or all of the elements described relative to the computer, although, for purposes of brevity, only a memory/data store 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the internet.

When used in a LAN networking environment, the computer 2000 is connected to the local network 2052 through a wired and/or wireless communication network interface or adapter 2056. The adapter 2056 can facilitate wired or wireless communication to the LAN 2052, which can also include a wireless access point disposed thereon for communicating with the wireless adapter 2056.

When used in a WAN networking environment, the computer 2000 can include a modem 2058, or is connected to a communications server on the WAN 2054, or has other means for establishing communications over the WAN 2054, such as by way of the internet. The modem 2058, which can be internal or external and a wired or wireless device, is connected to the system bus 2008 through the input device interface 2042. In a networked environment, program modules depicted relative to the computer, or portions thereof, can be stored in the remote memory/data store 2050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the internet, and to wired networks (which use IEEE 802.3 or Ethernet). Wi-Fi networks operate in the unlicensed 2.4 and 5 GHz radio bands and in accordance with, for example, IEEE 802.11 standards, or with products that contain both bands (dual band), so the networks can provide real-world performance similar to the basic "10BaseT" wired Ethernet networks used in many offices.

Figure 21:
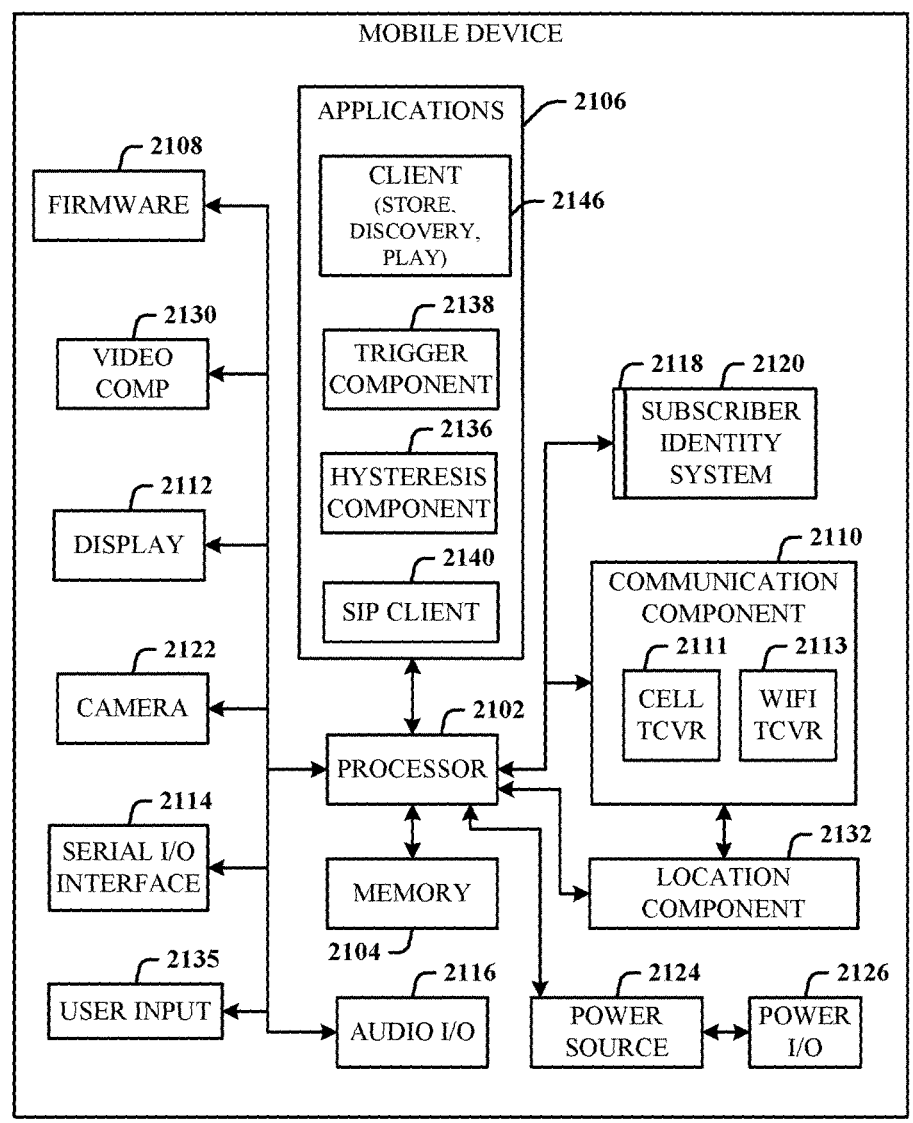
FIG. 21 illustrates a block diagram of an example mobile device that can be operable to execute processes and methods in accordance with various aspects and embodiments of the subject disclosure.

Referring now to FIG. 21, illustrated is a schematic block diagram of a mobile device 2100 (which can be, for example, called party UE 220) capable of connecting to a network in accordance with some embodiments described herein. Although a mobile device 2100 is illustrated herein, it will be understood that other devices can be a mobile device, and that the mobile device 2100 is merely illustrated to provide context for the embodiments of the various embodiments described herein. The following discussion is intended to provide a brief, general description of an example of a suitable environment 2100 in which the various embodiments can be implemented. While the description comprises a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic data stores, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The mobile device 2100 comprises a processor 2102 for controlling and processing all onboard operations and functions. A memory 2104 interfaces to the processor 2102 for storage of data and one or more applications 2106 (e.g., a video player software, user feedback component software, etc.). Other applications can include voice recognition of predetermined voice commands that facilitate initiation of the user feedback signals. The applications 2106 can be stored in the memory 2104 and/or in a firmware 2108, and executed by the processor 2102 from either or both the memory 2104 or/and the firmware 2108. The firmware 2108 can also store startup code for execution in initializing the mobile device 2100. A communications component 2110 interfaces to the processor 2102 to facilitate wired/wireless communication with external systems, e.g., cellular networks, VoIP networks, and so on. Here, the communications component 2110 can also include a suitable cellular transceiver 2111 (e.g., a GSM transceiver) and/or an unlicensed transceiver 2113 (e.g., Wi-Fi, WiMax) for corresponding signal communications. The mobile device 2100 can be a device such as a cellular telephone, a PDA with mobile communications capabilities, and messaging-centric devices. The communications component 2110 also facilitates communications reception from terrestrial radio networks (e.g., broadcast), digital satellite radio networks, and internet-based radio services networks.

The mobile device 2100 comprises a display 2112 for displaying text, images, video, telephony functions (e.g., a Caller ID function), setup functions, and for user input. For example, the display 2112 can also be referred to as a "screen" that can accommodate the presentation of multimedia content (e.g., music metadata, messages, wallpaper, graphics, etc.). The display 2112 can also display videos and can facilitate the generation, editing and sharing of video quotes. A serial I/O interface 2114 is provided in communication with the processor 2102 to facilitate wired and/or wireless serial communications (e.g., USB, and/or IEEE 1394) through a hardwire connection, and other serial input devices (e.g., a keyboard, keypad, and mouse). This supports updating and troubleshooting the mobile device 2100, for example. Audio capabilities are provided with an audio I/O component 2116, which can include a speaker for the output of audio signals related to, for example, indication that the user pressed the proper key or key combination to initiate the user feedback signal. The audio I/O component 2116 also facilitates the input of audio signals through a microphone to record data and/or telephony voice data, and for inputting voice signals for telephone conversations.

The mobile device 2100 can include a slot interface 2118 for accommodating a SIC (Subscriber Identity Component) in the form factor of a card Subscriber Identity Module (SIM) or universal SIM 2120, and interfacing the SIM card 2120 with the processor 2102. However, it is to be appreciated that the SIM card 2120 can be manufactured into the mobile device 2100, and updated by downloading data and software.

The mobile device 2100 can process IP data traffic through the communication component 2110 to accommodate IP traffic from an IP network such as, for example, the internet, a corporate intranet, a home network, a person area network, etc., through an ISP or broadband cable provider. Thus, VoIP traffic can be utilized by the mobile device 2100 and IP-based multimedia content can be received in either an encoded or decoded format.

A video processing component 2122 (e.g., a camera) can be provided for decoding encoded multimedia content. The video processing component 2122 can aid in facilitating the generation, editing and sharing of video quotes. The mobile device 2100 also comprises a power source 2124 in the form of batteries and/or an AC power subsystem, which power source 2124 can interface to an external power system or charging equipment (not shown) by a power I/O component 2126.

The mobile device 2100 can also include a video component 2130 for processing video content received and, for recording and transmitting video content. For example, the video component 2130 can facilitate the generation, editing and sharing of video quotes. A location tracking component 2132 facilitates geographically locating the mobile device 2100. As described hereinabove, this can occur when the user initiates the feedback signal automatically or manually. A user input component 2134 facilitates the user initiating the quality feedback signal. The user input component 2134 can also facilitate the generation, editing and sharing of video quotes. The user input component 2134 can include such conventional input device technologies such as a keypad, keyboard, mouse, stylus pen, and/or touch screen, for example.

Referring again to the applications 2106, a hysteresis component 2136 facilitates the analysis and processing of hysteresis data, which is utilized to determine when to associate with the access point. A software trigger component 2138 can be provided that facilitates triggering of the hysteresis component 2138 when the Wi-Fi transceiver 2113 detects the beacon of the access point. A SIP client 2140 enables the mobile device 2100 to support SIP protocols and register the subscriber with the SIP registrar server. The applications 2106 can also include a client 2142 that provides at least the capability of discovery, play and store of multimedia content, for example, music.

The mobile device 2100, as indicated above related to the communications component 2110, comprises an indoor network radio transceiver 2113 (e.g., Wi-Fi transceiver). This function supports the indoor radio link, such as IEEE 802.11, for the dual-mode GSM mobile device 2100. The mobile device 2100 can accommodate at least satellite radio services through a handset that can combine wireless voice and digital radio chipsets into a single handheld device.\

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic data store, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a data store and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", "storage device," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments can comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," "station," "access terminal," "terminal," "handset," and similar terminology, can generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "called party," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
 receiving, by a network device comprising a processor, a robotic call that has been approved by the network device for connection to a user device;
 determining, by the network device, whether a condition is present that precludes acceptance of the robotic call by the user device, wherein the determining comprises:
  determining whether user preference data stored on a network data store, the user preference data being representative of a preference associated with a user identity, is applicable to the robotic call, and
  in response to the user preference data being determined to be applicable to the robotic call,
  determining, based on the user preference data, whether the condition is present; and
 in response to the condition being determined not to be present, enabling, by the network device, the acceptance of the robotic call.

2. The method of claim 1, wherein the user device comprises a mobile device.

3. The method of claim 1, wherein the user preference data comprises an indication to deny the robotic call based on information received from a sensory device coupled to the user device.

4. The method of claim 3, wherein the sensory device is operable to determine sleep statistics based on biometric measurements associated with the user identity made by the sensory device.

5. The method of claim 3, wherein the sensory device is operable to determine a heart rate of the user identity based on heart beat measurements associated with the user identity made by the sensory device.

6. The method of claim 1, wherein the user preference data comprises an indication to deny the robotic call based on location data being determined to correlate to a location of the user device.

7. The method of claim 1, wherein the user preference data comprises an indication to deny the robotic call based on a calendar entry associated with the user identity.

8. The method of claim 7, wherein the determining whether the condition is present further comprises determining whether the calendar entry comprises a keyword that indicates the condition.

9. A network device, comprising:
 a processor; and
 a memory that stores executable instructions that, when executed by the processor, facilitate performance of operations, comprising:
  receiving a robotic call from a communications device, wherein the robotic call was approved by the network device for connection to a user equipment,
  determining whether user preference data accessible via a network data store, the user preference data being representative of a preference associated with a user identity, is applicable to the robotic call,
  based on the user preference data and information received from a sensory device coupled to the user equipment, determining whether a condition exists that precludes acceptance of the robotic call, and
  in response to the condition being determined to exist, denying the robotic call.

10. The network device of claim 9, wherein the user equipment comprises a mobile device.

11. The network device of claim 9, wherein the information from the sensory device comprises a heart rate of the user identity.

12. The network device of claim 9, wherein the information from the sensory device indicates that the user identity is engaged in a physical activity comprising a sport activity.

13. The network device of claim 9, wherein the information from the sensory device indicates that the user identity is engaged in a physical activity comprising an exercise activity.

14. The network device of claim 9, wherein the information from the sensory device comprises location data, and wherein the location data correlates to a location of the user equipment.

15. The network device of claim 14, wherein the user preference data comprises an indication to deny the robotic call based on the location data.

16. The network device of claim 9, wherein the denying the robotic call comprises blocking the robotic call.

17. The network device of claim 9, wherein the denying the robotic call comprises directing that a message related to the robotic call be stored for future access.

18. A network device, comprising:
    a processor; and
    a memory that stores executable instructions that, when executed by the processor, facilitate performance of operations, comprising:
        receiving a robotic call from a communications device, wherein the robotic call was approved by the network device for connection to a user equipment,
        determining whether user preference data, representative of a preference associated with a user identity and obtainable from a network data store, is applicable to the robotic call,
        in response to the user preference data being determined to be applicable to the robotic call,
        determining, based on the user preference data, whether a condition is present that precludes acceptance of the robotic call, and
        in response to the condition being determined to be present, denying the robotic call.

19. The network device of claim 18, wherein the denying the robotic call comprises blocking the robotic call.

20. The network device of claim 18, wherein the denying the robotic call comprises directing that a message related to the robotic call be stored for future access.

* * * * *